US007668684B2

(12) United States Patent
Muro et al.

(10) Patent No.: US 7,668,684 B2
(45) Date of Patent: Feb. 23, 2010

(54) SENSOR NETWORK SYSTEM AND DATA MANAGEMENT METHOD FOR SENSOR NETWORK

(75) Inventors: Keiro Muro, Koganei (JP); Kei Suzuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 11/797,035

(22) Filed: Apr. 30, 2007

(65) Prior Publication Data

US 2008/0055113 A1 Mar. 6, 2008

(30) Foreign Application Priority Data

Aug. 30, 2006 (JP) ........................... 20006-233403

(51) Int. Cl.
*G06F 3/01* (2006.01)

(52) U.S. Cl. ....................... 702/122; 702/123; 702/182; 702/183

(58) Field of Classification Search ................. 702/122, 702/127, 181, 182, 185, 188, 123, 183; 340/870.16; 455/522; 709/203
See application file for complete search history.

(56) References Cited

U.S. PATENT DOCUMENTS 7,398,164 B2 * 7/2008 Ogushi et al. ................. 702/42
2006/0282498 A1 * 12/2006 Muro ......................... 709/203

FOREIGN PATENT DOCUMENTS

JP 11-039034 7/1997
JP 2006-072908 9/2004
JP 2006-344017 6/2005

* cited by examiner

*Primary Examiner*—Eliseo Ramos Feliciano
*Assistant Examiner*—Felix E Suarez
(74) *Attorney, Agent, or Firm*—Stites & Harbison PLLC; Juan Carlos A. Marquez, Esq.

(57) ABSTRACT

In a sensor network system for transferring sensing data measured by a sensor node to a host server based upon a process condition, the process condition can be easily set. The host server (4) previously sets a transmission condition which is used to transmit only an event satisfying a preset condition to the host server (4). When the host server (4) receives a joined event from a PAN management server (2), the host server (4) transmits to the PAN management server (2) a transmission condition corresponding to an identifier of an ID of a sensor node (1) of a transmission source of the joined event, and the PAN management server (2) transfers only an observed event satisfying the transmission condition to the host server (4).

15 Claims, 25 Drawing Sheets

750 PAN MANAGEMENT TABLE

| ID | DELIVERY RULE |
|---|---|
| 00:11:22:33:44:55 | TRANSMIT WHEN TEMPERATURE EXCEEDS 20°C |
| 00:12:22:33:44:55 | TRANSMIT WHEN TEMPERATURE EXCEEDS 5°C |
| : | : |
| | |

410 NODE MANAGEMENT TABLE

| ID | DELIVERY RULE | ACTION RULE | POSITIONAL INFORMATION |
|---|---|---|---|
| 00:11:22:33:44:55 | TRANSMIT WHEN TEMPERATURE EXCEEDS 20°C | NOTIFY WARNING WHEN TEMPERATURE EXCEEDS 30°C | WAREHOUSE #2 |
| 00:12:22:33:44:55 | TRANSMIT WHEN TEMPERATURE EXCEEDS 5°C | — | WAREHOUSE #1 |
| : | : | : | : |
| | | | |

| # | SORT | EVENT NAME | SAMPLE |
|---|---|---|---|
| 1 | PRIMARY EVENT | JOINED EVENT | <Event name=“ joined ” ><br><creator type=“ MAC ”>006e00002311</creator><br><reporter type= “ IP ” >192.168.0.1:5000</reporter><br></Event> |
| 2 | | DISJOINED EVENT | <Event name= “ disjoined ” ><br><creator type=“ MAC ” >006e00002311</creator><br><reporter type= “ IP ” >192.168.0.1:5000</reporter><br></Event> |
| 3 | | OBSERVED EVENT | <Event name= “observed” ><br><creator type=“ MAC ” >006e00002311</creator><br><reporter type= “ IP” >192.168.0.1:5000</reporter><br><temperature>23.5</temperature><br></Event> |
| 4 | SECONDARY EVENT | BOUND EVENT | <Event name= “bound ” ><br><creator type= “ obj ” >2</creator><br><reporter type= “ obj ” >2</reporter><br><role> isIn </role><br><with>1</with><br></Event> |
| 5 | | UNBOUND EVENT | <Event name= “unbound ” ><br><creator type= “ obj ” >2</creator><br><reporter type= “ obj ” >2</reporter><br><role> isIn </role><br><with>1</with><br></Event> |
| 6 | | UPDATED EVENT | <Event name=“ updated ” ><br><creator type= “ obj ” >2</creator><br><reporter type= “ obj ” >2</reporter><br><temperature>23.5</temperature><br></Event> |
| 7 | | TRANSFERRED UPDATED EVENT | <Event name=“ updated ” ><br><creator type= “ obj ” >2</creator><br><reporter type= “ obj ” >1</reporter><br><temperature>23.5</temperature><br></Event> |

*FIG. 16*

| # | SORT | COMPARATOR | MEANING | EXAMPLE |
|---|---|---|---|---|
| 1 | SINGLE | TRUE | ALWAYS TRUE | TO ALL EVENTS |
| 2 | | ISNAME | EVENT NAME IS COINCIDENT WITH DESIGNATED VALUE | IF OBSERVED EVENT IS PRESENT |
| 3 | | HASPARAM | HAS DESIGNATED PARAMETER | IF "OBSERVED TEMPERATURE" IS HELD IN EVENT |
| 4 | | ISPARAM | DESIGNATED PARAMETER IS COINCIDENT WITH DESIGNATED VALUE | IF NODE ID IS 10 |
| 5 | | GTPARAM | DESIGNATED PARAMETER IS LARGER THAN DESIGNATED VALUE | IF OBSERVATION TEMPERATURE IS HIGHER THAN 30°C |
| 6 | | LTPARAM | DESIGNATED PARAMETER IS SMALLER THAN DESIGNATED VALUE | IF OBSERVATION TEMPERATURE IS LOWER THAN 30°C |
| 7 | | AND | AND JUDGEMENT OF 1-8 COMBINATION | IF NODE ID IS 10 AND HAS OBSERVATION TEMPERATURE |
| 8 | | OR | OR JUDGEMENT OF 1-8 COMBINATION | IF OBSERVATION TEMPERATURE IS NOT EQUAL TO 10 TO 30°C |
| 9 | COMPOSITE | DISJUNCTION | IF EVENT 1 OR EVENT 2 IS OBSERVED | IF MR. YAMADA OR MR. TANAKA COMES |
| 10 | | CONJUNCTION | IF EVENT 1 AND EVENT 2 ARE OBSERVED | IF MR. YAMADA AND MR. TANAKA COME |
| 11 | | SEQUENCE | IF EVENT 2 IS OBSERVED AFTER EVENT 1 | IF MR. YAMADA COMES AFTER MEETING IS HELD |
| 12 | | CLOSURE | NEGLECT SAME EVENT FOR PREDETERMINED TIME AFTER EVENT ARRIVES | REPORT IF RFID IS OBSERVED, NOTE THAT NEGLECT SAME ID FOR 5 MINUTES |
| 13 | | HISTORY | IF EVENT IS OBSERVED N TIMES OR MORE FOR PREDETERMINED TIME | IF COMMUNICATION FAILURE CONTINUOUSLY OCCURS 5 TIMES |
| 14 | | NOT | IF EVENT IS NOT OBSERVED FOR PREDETERMINED TIME | IF TEMPERATURE OBSERVED EVENT HAS NOT REACHED FOR 5 MINUTES |

FIG. 17

SORT OF DATA MANAGED BY OBJECT MANAGER

| # | CLASSI-FICATION | SORT | CONTENT | MANAGEMENT ITEM |
|---|---|---|---|---|
| 1 | SCHEMA | SCHEMAS | SET OF SCHEMA | NONE |
| 2 | | SCHEMA | DEFINITION OF DATA STRUCTURE | OWN SCHEMA NAME |
| 3 | | SCHEMA PROPERTY | SORT OF ATTRIBUTE THAT CAN BE HELD BY PRESENT SCHEMA | ATTRIBUTE NAME, DATA TYPE |
| 4 | | SCHEMA RELATION | SORT OF RELATION THAT CAN BE HELD BY PRESENT SCHEMA | ROLE NAME, PLURALITY OF FLAGS |
| 5 | | SCHEMA REF | REFER TO SCHEMA THAT CAN BE HELD BY PRESENT SCHEMA RELATION | SCHEMA NAME OF RELATED DESTINATION |
| 6 | INSTANCE | INSTANCES | SET OF INSTANCE | NONE |
| 7 | | INSTANCE | SUBSTANCE OF DATA STRUCTURE | OWN ID |
| 8 | | INSTANCE PROPERTY | ATTRIBUTE SUBSTANCE OF PRESENT INSTANCE | FINAL UPDATE DAY OF ATTRIBUTE VALUE |
| 9 | | INSTANCE RELATION | RELATION SUBSTANCE OF PRESENT INSTANCE | NONE |
| 10 | | INSTANCE REF | REFER TO INSTANCE HELD BY PRESENT INSTANCE RELATION | ID OF RELATED DESTINATION |
| 11 | | SUBSCRIBE RULE | RULE FOR UPDATING PRESENT INSTANCE | RELATED PATH COMPARATOR |
| 12 | | ACTION RULE | PROCESS LOGIC RELATED TO PRESENT INSTANCE | COMPARATOR EXECUTION SCRIPT |

FIG. 19

EXAMPLE OF SCHEMA DEFINITION REGISTERED IN OBJECT MANGER

```
<Schemas>
    <Schema name = " PAN " >
        <Property name = " IP " dataType = " text " />
    </Schema>
    <Schema name= " Node " >
        <Property name = " MAC " dataType = " int 64 " />
        <Property name = " temperature " dataType = " double " />
        <Relation roleName = " isIn " >
         <Schema nameref = " PAN " />
        </Relation>
    </Schema>
</Schemas>
```

FIG. 21

EXAMPLE OF INSTANCE DEFINITION REGISTERED IN OBJECT MANAGER

```
<Instances>
< hasA >
  <PAN id = " 1 " >
    <IP>192.168.0.1:5000</IP>
  </PAN>
  <Node id = " 2 " >
    <MAC>006e00002311</MAC>
    <temperature>23</temperature>
    < isIn >
      <PAN  idref = " 1 " />
    </ isIn >
    < hasRule >
      < SubscribeRule  id = " 3 "    path = " isIn " /PAN  >
        <and>
          < isName >observed</ isName >
          < isParam  name = " Node " >006e00002311</ isParam >
        </and>
      </ SubscribeRule >
      < ActionRule id = " 4 " >
        < hasParam >temperature</ hasParam >
        < setProperty name = " temperature " >
          < Param >temperature</ Param >
        </ setProperty >
      </ ActionRule >
    </ hasRule >
  </Node >
</ hasA >
</Instances>
```

Labels: EC1, SubscribeRule, EC2, Action2, ActionRule

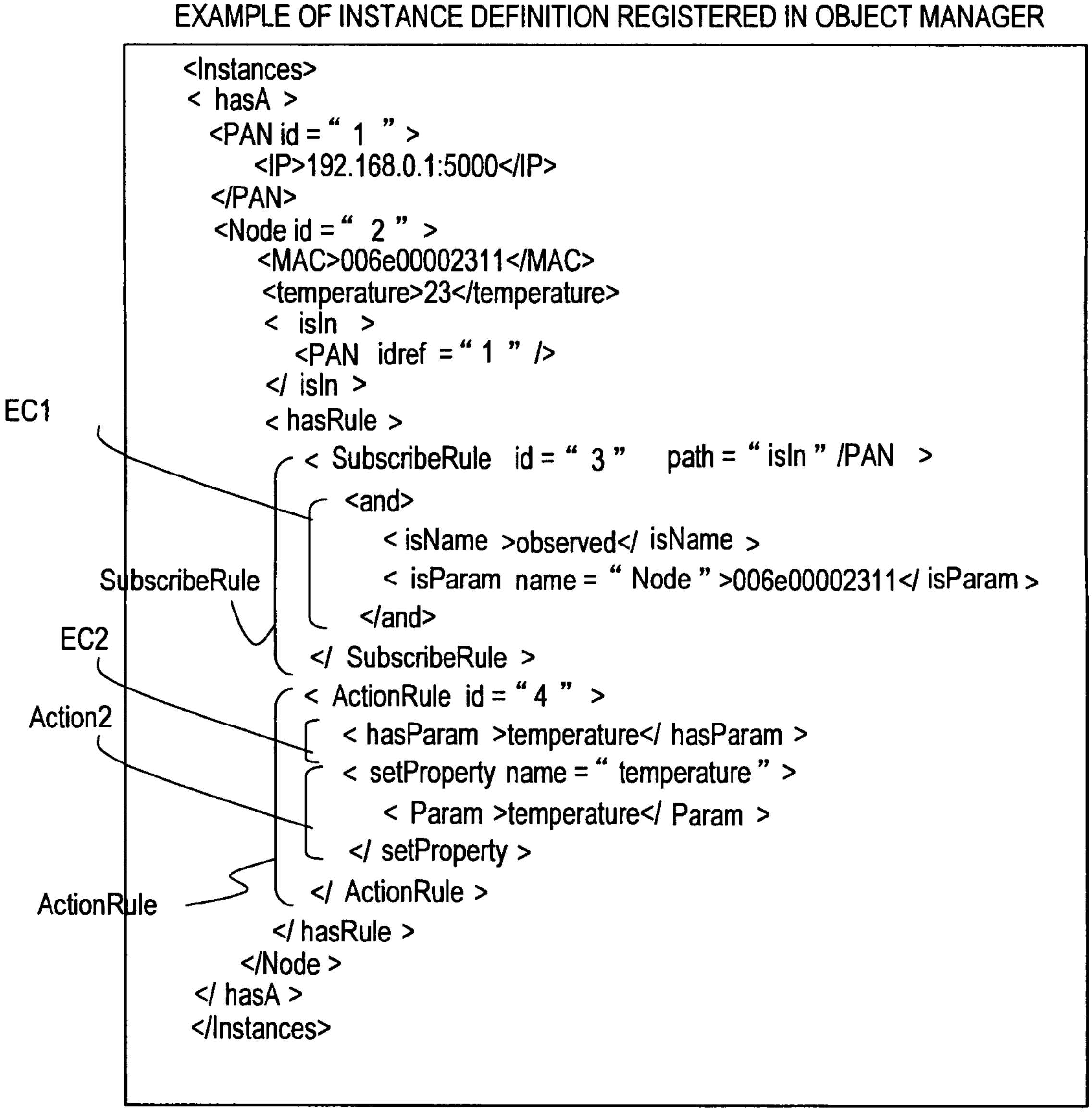

FIG. 22

SORT OF COMMAND PROVIDED BY OBJECT MANAGER

| # | COMMAND | | ARGUMENT | RETURN VALUE |
|---|---|---|---|---|
| 1 | GETINSTANCE | ACQUIRE INSTANCE | PATH | INSTANCE |
| 2 | ADDINSTANCE | ADD INSTANCE | INSTANCE | BOOLEAN |
| 3 | DROPINSTANCE | DELETE INSTANCE | PATH | BOOLEAN |
| 4 | GETPROPERTY | ACQUIRE ATTRIBUTE | PATH | PROPERTY |
| 5 | UPDATE | UPDATE ATTRIBUTE | PATH<br>PROPERTY | BOOLEAN |
| 6 | BIND | BIND | PATH | BOOLEAN |
| 7 | UNBIND | UNBIND | PATH | BOOLEAN |
| 8 | GETCOMPARATOR | ACQUIRE DELIVERY RULE | PATH | COMPARATOR |
| 9 | SETCOMPARATOR | SET DELIVERY RULE | PATH<br>COMPARATOR | BOOLEAN |
| 10 | DROPCOMPARATOR | DELETE DELIVERY RULE | PATH | BOOLEAN |
| 11 | GETACTIONRULE | ACQUIRE ACTION RULE | PATH | COMPARATOR<br>SCRIPT |
| 12 | SETACTIONRULE | SET ACTION RULE | PATH<br>COMPARATOR<br>SCRIPT | BOOLEAN |
| 13 | DROPACTIONRULE | DELETE ACTION RULE | PATH | BOOLEAN |

*FIG. 23*

SENSOR NETWORK SYSTEM AND DATA MANAGEMENT METHOD FOR SENSOR NETWORK

CLAIM OF PRIORITY

The present application claims priority from Japanese application P2006-233403 filed on Aug. 30, 2006, the content of which is hereby incorporated by reference into this application.

BACKGROUND OF THE INVENTION

This invention relates to a technique for utilizing information derived from a large number of sensor nodes connected to a network. More specifically, this invention relates to a technique for managing information transmitted by sensor nodes capable of moving among nodes.

Recently, techniques of sensor network systems for acquiring sensing data obtained from a large number of sensor nodes via networks are being developed. In the sensor network systems, information acquired by the large number of sensor nodes is utilized via networks by computers and apparatuses installed at places apart from the sensor nodes.

In the sensor network systems, sensing data acquired by the large number of sensor nodes is transmitted via repeating stations and base stations to a server computer and the like, and the server computer collects information of the respective sensor nodes. In the sensor network systems with the structure as described above, when the sensing data acquired by the sensor nodes is directly transmitted to host server computers, traffic amounts of the sensor network systems become huge, and it becomes difficult for the host server computers to specify necessary information. Thus, there are known sensor network systems in which only sensing data satisfying preset process conditions among pieces of sensing data acquired by sensor nodes is transmitted to host server computers (refer to, for instance, JP-A-11-39034).

SUMMARY OF THE INVENTION

In a case where sensor nodes are connected to mobile communication networks to be applied to physical distribution systems, statuses of articles in transportation stages can be monitored in real time. For instance, sensor nodes containing wireless communication apparatuses are mounted on containers which are transported by vehicles such as trucks; intermediate apparatuses such as base stations for carrying out communication with those sensor nodes are provided in warehouses, truck terminals, and the like to which those containers are collected and delivered; and the intermediate apparatuses are connected via a WAN or the like to host server computers (will be referred to as “host servers” hereinafter). Then, the intermediate apparatuses acquire sensing data of the sensor nodes and transfer the acquired sensing data to the host servers. As a result, in the host servers, statuses of containers under transportation can be monitored in real time.

Here, if the above-mentioned conventional technique is applied to the intermediate apparatuses such as the base stations, only sensing data satisfying the preset process conditions can be transmitted to the host servers. As a result, while containers are constantly monitored by the sensor nodes, only the necessary sensing data can be transmitted to the host server computers, and thus, it is possible to avoid unnecessary transmission of sensing data.

However, in the above-mentioned conventional technique, since process conditions are required to be previously set to the intermediate apparatuses, the process conditions must be previously set with respect to all of intermediate apparatuses through which containers to be monitored may pass. Accordingly, in a physical distribution system including a large number of intermediate apparatuses, there has been a problem in that processing of specifying a distribution channel for each of the containers, and distributing process conditions to all the intermediate apparatuses in those specified distribution channels in advance is necessary. Alternatively, process conditions with respect to the sensor nodes of the containers to be monitored can be set to all of the intermediate apparatuses without specifying the distribution channel for each of the containers. However, in this case, a process condition of the sensor nodes not expected to pass is also set to the respective intermediate apparatuses. As a result, there has been a problem in that storage capacities required for repeating apparatuses such as base stations and processing loads of those repeating apparatuses are increased.

Moreover, when articles to be stored in the above-mentioned containers are to be changed, an evaluation standard of sensing data must be changed, and thus, the host server is required to set a new evaluation standard to the respective repeating apparatuses. As a consequence, in the host server, a new process condition is set again with respect to the repeating apparatuses through which containers may pass, leading to a problem in that a very heavy work load is required for the re-setting of the new process condition. In particular, in large-scaled physical distribution systems which operate a large number of sensor nodes, processing of grasping distribution channels of containers to set a new process condition again may cause the processing loads of host servers to be excessively heavy. Also, there have been cases where traffic of sensor network systems becomes excessively large.

This invention has been made in view of the above-mentioned problems, and therefore has an object to facilitate setting of process conditions in a sensor network system in which sensing data measured by sensor nodes is transferred to a host server based upon the process conditions.

According to an aspect of this invention, there is provided a data management method for a sensor network, in which an event based upon information observed by a sensor is transmitted by a client apparatus including a sensor node to an intermediate apparatus, and the intermediate apparatus transmits the event received from the sensor node to a host computer, the method including the steps of: storing, by the host computer, a transmission condition for transmitting to the host computer only second information satisfying a preset condition from the event received from the client apparatus by the intermediate apparatus; transmitting, by the host computer, when first information is received from the intermediate apparatus, a transmission condition determined based upon the received first information to the intermediate apparatus which has transmitted the first information; judging, by the intermediate apparatus, whether the event received from the client apparatus corresponds to one of the first information to be transferred to the host computer and the second information to be one of stored and discarded in a storage apparatus of the intermediate apparatus; transmitting, by the intermediate apparatus, the first information to the host computer when the first information is received; storing, by the intermediate apparatus, when a transmission condition corresponding to the first information is received from the host computer, the transmission condition in correspondence with an identifier of the client apparatus corresponding to the first information in a transmission condition managing unit; and acquiring, by the intermediate apparatus, a transmission condition corresponding to the identifier of the client apparatus, and transmitting the second information to the host computer only when the second information satisfies the acquired transmission condition.

Further, according to the aspect of this invention, in the data management method for a sensor network system the first information corresponds to a joined event and the second information corresponds to an observed event; the step of storing the transmission condition includes setting the transmission condition for each identifier of the client apparatus; and the step of transmitting the transmission condition to the intermediate apparatus which has transmitted the first information includes extracting a transmission condition corresponding to the identifier of the client apparatus of a transmission source of the joined event from the stored transmission conditions.

Further, according to the aspect of this invention, the data management method for a sensor network system further includes: previously setting, by the host computer, an execution condition which is used to execute a predetermined processing when the observed event (second information) is received for each identifier of the client apparatus; and acquiring, by the host computer, when the observed event is received from the intermediate apparatus, the execution condition based upon the identifier of the client apparatus contained in the observed event, and executing the predetermined processing only when the observed event satisfies the execution condition.

Therefore, according to the sensor network system of this invention, when an observed event of a client apparatus which includes a sensor node connectable with any one of the intermediate apparatuses is monitored, a transmission condition of the observed event only needs to be set to a host computer. Therefore, the transmission condition can be very easily set without paying specific attention to the location of the client apparatus.

BRIEF DESCRIPTION OF THE DRAWINGS

FIG. 8 is an explanatory diagram for showing an example of a PAN management table of the PAN management server according to the first embodiment.

FIG. 9 is an explanatory diagram for showing an example of a node management table of the host server according to the first embodiment.

FIG. 16 is an explanatory diagram for showing an example of sorts of events published by the event publisher of the PAN management server according to the first embodiment.

FIG. 17 is an explanatory diagram for showing an example of sorts of event comparators of the PAN management server according to the first embodiment.

FIG. 19 is an explanatory diagram for showing an example of sorts of data managed by the object manager of the PAN management server according to the first embodiment.

FIG. 21 is an explanatory diagram for showing an example of definitions of schemas managed by the object manager of the PAN management server according to the first embodiment.

FIG. 22 is an explanatory diagram for showing an example of definitions of instances managed by the object manager of the PAN management server according to the first embodiment.

FIG. 23 is an explanatory diagram for showing an example of commands provided by the object manager of the PAN management server according to the first embodiment.

DETAILED DESCRIPTION OF THE PREFERRED EMBODIMENTS

Referring to the accompanying drawings, embodiments of this invention will be described.

First Embodiment

Figure 1:
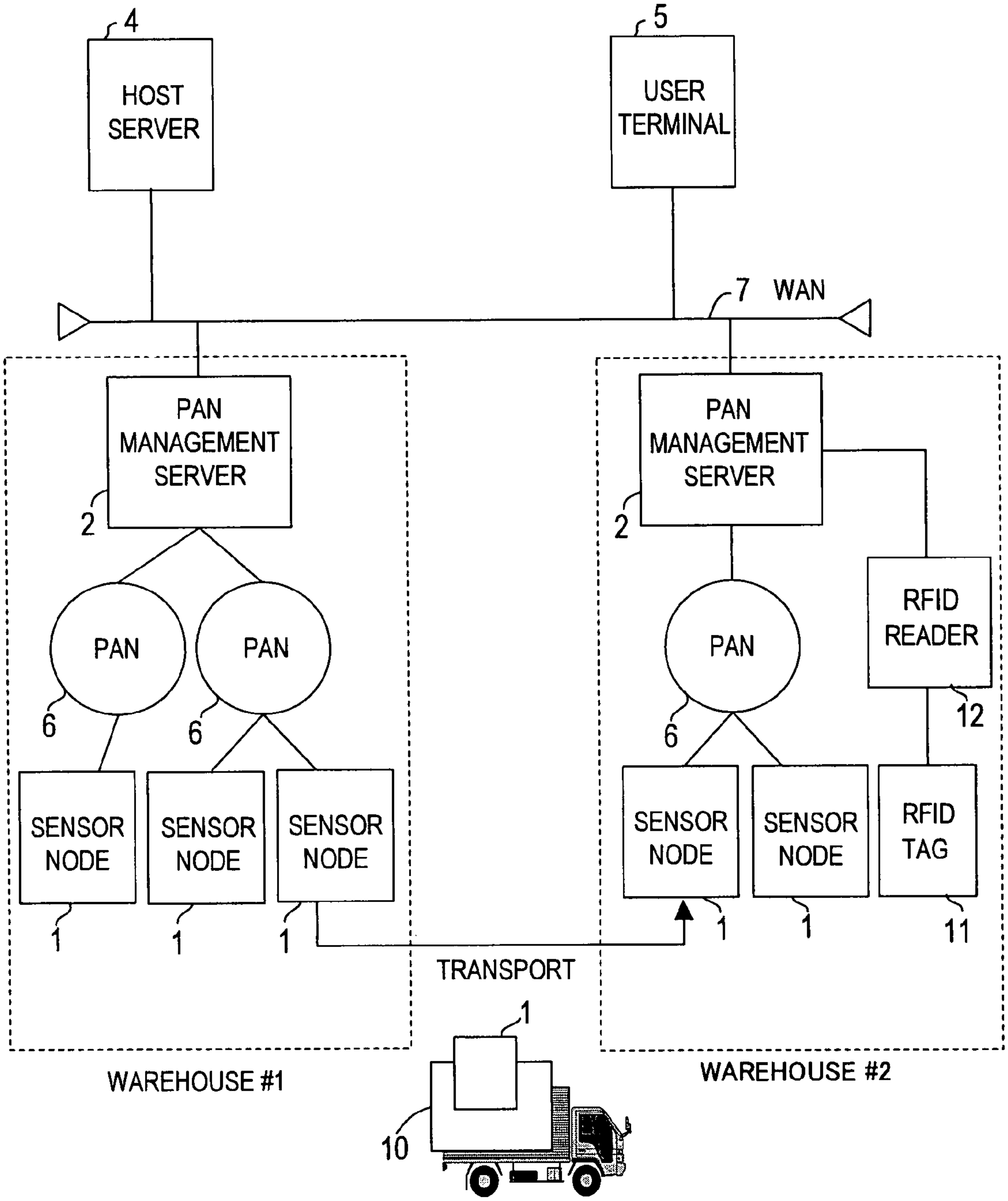
FIG. 1 is a block diagram for showing a sensor network system according to a first embodiment of this invention.

FIG. 1 is a block diagram for showing a sensor network system to which a first embodiment of this invention is applied.

(Configuration of Sensor Network System)

In the sensor network system, environmental information is observed by sensors provided on a large number of sensor nodes 1 which are dispensed in the environment, and then, the observed information is transmitted via a personal area network (PAN) server 2 to a host server 4. The PAN management server 2 is connected via a wireless network 6 which is comprised of a PAN or the like. Then, since the observed information is acquired by the host server 4, the sensor network system corresponds to such a computer system capable of aiding a user terminal 5 to determine a user intention and the like. The host server 4 has a database which stores thereinto the acquired observed information.

This embodiment shows such an example that the sensor network system of this invention is applied to a container management system. In the container management system, a sensor node 1 capable of transmitting observed information via the wireless network 6 is installed in a container 10 which moves among a plurality of warehouses #1 and #2, and conditions of articles delivered by the container 10 are managed by the host server 4 based upon the observed information of the sensor node 1.

The sensor node 1 contains a sensor such as a temperature sensor or a humidity sensor. The sensor node 1 is mounted on the container 10 for delivering the articles, measures environmental information inside the container 10, and transmits the observed information to a PAN management server 2 which is connectable via the wireless network 6.

The PAN management server 2 communicatable with the sensor node 1 via the wireless network 6 is provided in each of the warehouse #1 and the warehouse #2 shown in FIG. 1. The PAN management servers 2 of the respective warehouses #1 and #2 are connected to the host server 4 via a wide area network (WAN) 7 which is constituted by a wired network and the like. Also, the user terminal 5 is connected to the WAN 7, while the user terminal 5 sets an action rule as a process condition to the host server 4, and receives a notification from the host server 4 based upon the observed information transmitted from the sensor node 1. The action rule is executed when a transmission rule of the observed information and the observed information satisfies a predetermined condition.

When a new sensor node 1 is connected under management by the PAN management server 2, this PAN management server 2 notifies an identifier of the new sensor node 1 to the host server 4 connected to the WAN 7.

If a transmission rule has been allocated with respect to the relevant sensor node 1, the host server 4 transmits the transmission rule to the PAN management server 2. Then, the PAN management server 2 processes, in a following manner, the observed information which is received from the sensor node 1 in accordance with the transmission rule given by the host server 4.

A transmission rule defines such a condition that, among data received from the sensor node 1, which condition data to be transferred to a host apparatus has. For instance, in a case where a sensor 107 of the sensor node 1 contains a temperature sensor, this transmission rule is defined as follows. That is, "if observed information exceeds predetermined temperature, the observed information is transferred to host server 4." Also, in addition to the data selecting condition, a process rule of received data such as an ID of a host apparatus (host server 4) to be transmitted may be alternatively contained in the transmission rule. More specifically, if a host apparatus to be transmitted is further defined, the observed events may be allocated in accordance with management needs of the host apparatus. In this case, the PAN management server 2 corresponds to such a computer which functions as an intermediate apparatus or a base station, while this computer senses participation of a new sensor node 1 and leaving of the sensor node 1 via the wireless network 6, and transmits the observed information from the sensor node 1 to the host server 4.

The host server 4 functions as a sensor node which provides acquired observed information with respect to the user terminal 5, and performs various actions such as instructions and notification based upon the observed information with respect to an apparatus on the WAN 7.

It should be noted that when an RFID tag 11 is attached to the container 10, the PAN management server 2 includes an RFID reader 12 which reads this RFID tag 11. Also, the RFID readers 12 are provided in the warehouses #1 and #2, respectively. An identifier specific to the container 10 has been stored in the RFID tag 11. The PAN management server 2 reads the identifier of the container 10 by the RFID reader 12. Further, the container 10 functions as a client apparatus which contains the sensor node 1. Also, in FIG. 1, it is so assumed that the PAN management server 2 of the warehouse #1 also includes the RFID reader 12 (not shown).

Next, a detailed description is made of respective structural elements employed in the sensor network system shown in FIG. 1.

(Hardware Structure of Sensor Node)

Figure 2:
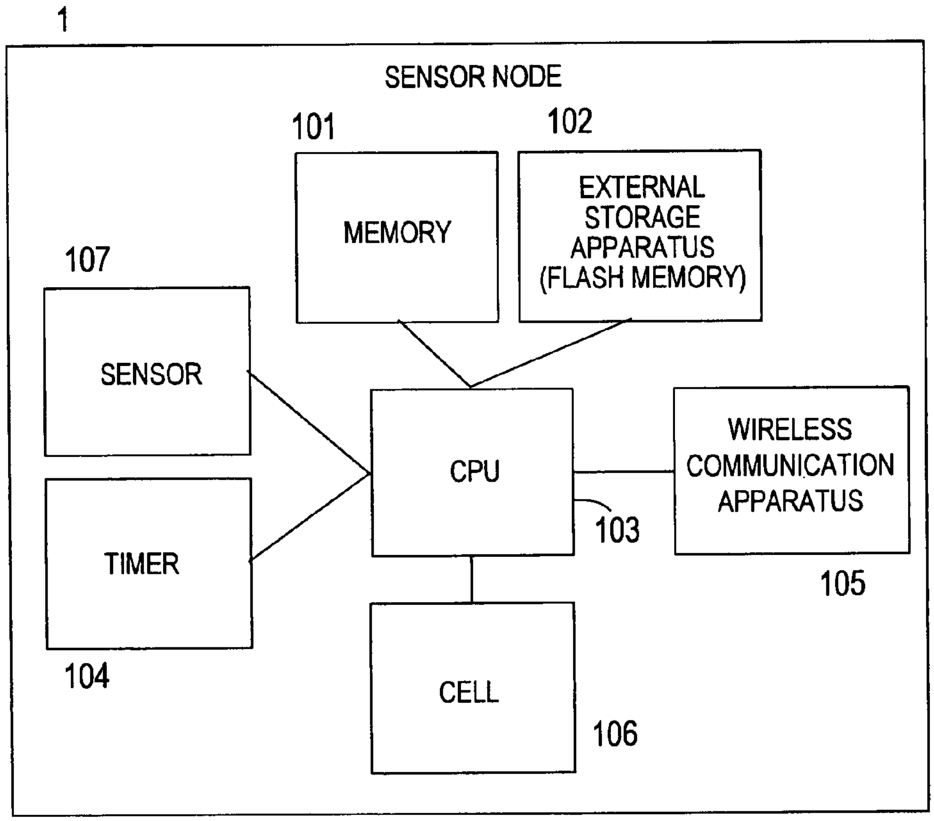
FIG. 2 is a block diagram for showing an appliance structure of a sensor node according to the first embodiment.

FIG. 2 is a block diagram for showing a configuration of the sensor node 1. The sensor node 1 is a node which observes an environment and issues observed information as an observed event. The sensor node 1 contains a memory 101, a CPU 103, an external nonvolatile storage apparatus 102 for storing data for a long time period, a sensor 107 for observing an environment, a timer 104 for initiating the sensor node 1 periodically, a wireless communication apparatus 105, and a cell 106. The wireless communication apparatus 105 communicates via the PAN 6 with the PAN management server 2 wirelessly. The cell 106 supplies electric power to respective structural units of the sensor node 1.

It should be noted that an event indicates information which stores thereinto information indicative of a status spontaneously issued by a node (either sensor node 1 or PAN management server 2), and indicative of a change in status, whereas a command represents information which is used to request the node to execute a certain processing.

When the sensor node 1 is initiated, a program recorded on the external storage apparatus 102 constituted by a flash memory or the like is read on the memory 101 so as to be executed by the CPU 103, whereby the sensor 107 is, as will be described later, driven in a predetermined time period (measuring interval) in order to acquire observed information, and the acquired information is transmitted to the PAN management server 2. The sensor node 1 repeatedly executes the following processings. That is, the CPU 103 is initiated every measuring interval preset to the timer 104 in order to prevent useless power consumption of the cell 106 and to realize a long term use, so that the CPU 103 acquires and transmits the observed information, and then, the CPU 103 and other units are advanced to sleep statuses. It should be noted that the measuring interval of the sensor node 1 is set to, for example, 5 minutes, and thus, the sensor node 1 intermittently transmits the observed information to the PAN management server 2.

As the sensor 107, there are exemplified a temperature sensor, a humidity sensor, an illuminance sensor, a strain sensor for sensing a looseness of a bolt, a pressure sensor for sensing seating on a chair and open/close of a door, an infrared sensor for sensing a presence of a person, and an infrared sensor for sensing a pulsatory. Also, a name card node put on clothes corresponds to a sensor node of one kind, and a switch for sensing an input entered by operating a button by a user corresponds to a sensor device.

(Structure of RFID Tag)

Figure 3:
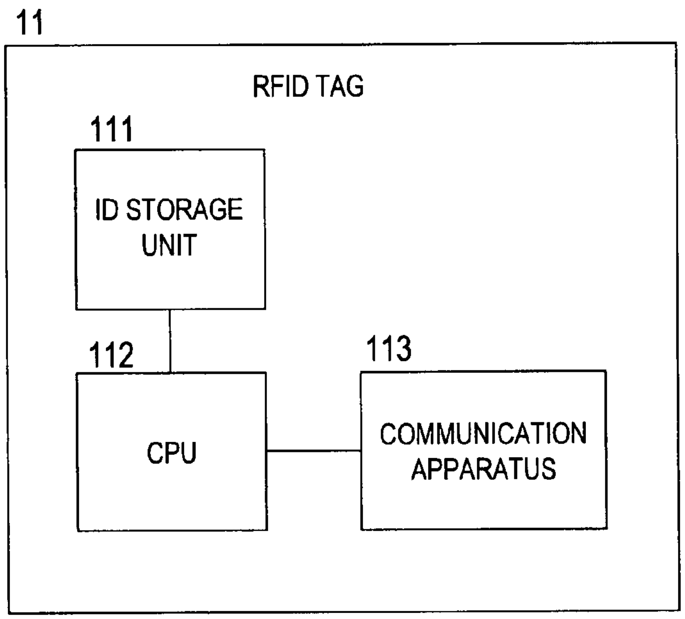
FIG. 3 is a block diagram for showing an appliance structure of an RFID according to the first embodiment.

FIG. 3 is a block diagram for indicating a structure of the RFID tag 11. The RFID tag 11 communicates with the RFID reader 12 in order to recognize an individual of a container 10.

The RFID tag 11 contains an ID storage unit 111 for storing thereinto a specific identifier, a CPU 112, and a communication apparatus 113 which communicates with the RFID reader 12 wirelessly.

(Hardware Configuration of PAN Management Server)

Figure 4:
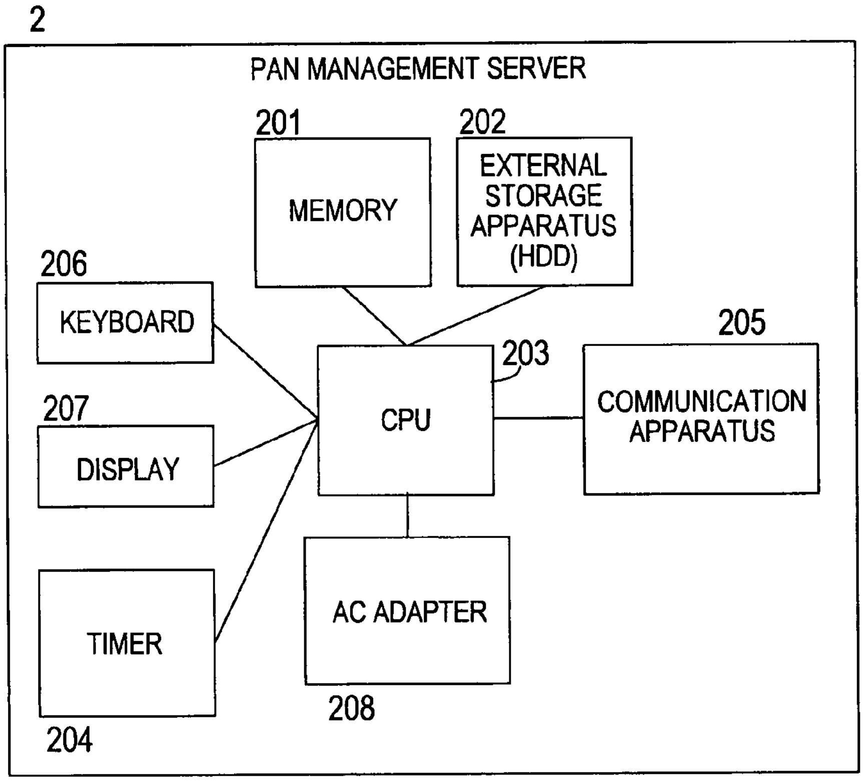
FIG. 4 is a block diagram for showing an appliance structure of a PAN management server according to the first embodiment.

FIG. 4 is a block diagram for showing a configuration of the PAN management server 2. The PAN management server 2 corresponds to a node which relays a communication. The PAN management server 2 includes a memory 201, a CPU 203, an external nonvolatile storage apparatus 202, a communication apparatus 205, a timer 204, an AC adapter 208, a keyboard 206, and a display 207. The external nonvolatile storage apparatus 202 stores thereinto data for a long time period. The communication apparatus 205 includes a wireless communication unit for performing a wireless communication via the wireless network 6, and a wired communication unit which communicates with the WAN 7 constituted by a wired network. The timer 204 detects a disjoined event of the sensor node 1 under management. The AC adapter 208 supplies electric power to the respective units of the PAN management server 2. The keyboard 206 accepts an operation made by an administrator or the like. The display 207 displays thereon information. When the PAN management server 2 is initiated, the CPU 203 reads a program stored in the external storage apparatus 202 comprised of a disk apparatus and the like on the memory 201, and the read program is executed by the CPU 203 so as to execute a predetermined processing. It should be noted that the PAN management server 2 may be connected via the communication apparatus 205 to the RFID reader 12.

The PAN management server 2 receives the observed information issued from the sensor node 1 as an observed event, and executes an action acquired from the host server 4 based upon the observed event. When a new sensor node 1 is connected under management, a major function of the PAN management server 2 notifies an identifier (ID) of the new sensor node 1 to the host server 4. The host server 4 notifies a preset transmission rule to the PAN management server 2 based upon the identifier (ID) of the sensor node 1. The PAN management server 2 acquires a transmission rule related to an observed event of the new sensor node 1, and processes the observed event received from the sensor node 1 in accordance with the transmission rule.

(Hardware Configuration of Host Server)

Figure 5:
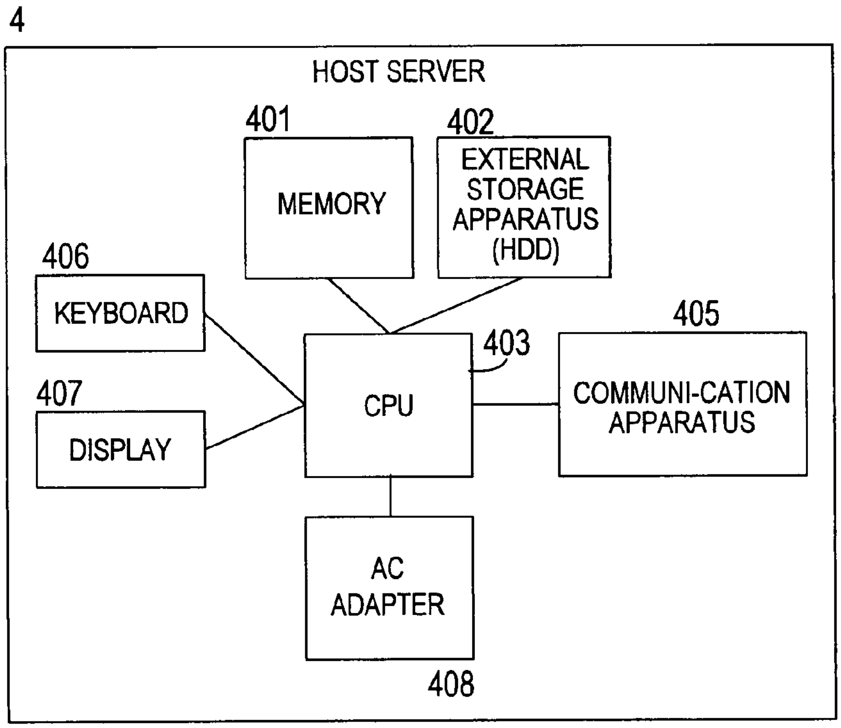
FIG. 5 is a block diagram for showing an appliance structure of a host server according to the first embodiment.

FIG. 5 is a block diagram for representing a configuration of the host server 4.

In FIG. 5, the host server 4 functions as a server node which transmits a process condition of the sensor node 1, acquires an event, or executes an action based upon an event.

The host server 4 includes a memory 401, a CPU 403, an external storage apparatus 402, a communication apparatus 405, an AC adapter 408, a keyboard 406, and a display 407. The external storage apparatus 402 stores data for a long time period. The communication apparatus 405 communicates with the WAN 7. The AC adapter 408 supplies electric power to the respective units in the host server 4. The keyboard 406 accepts an operation made by an administrator or the like. The display 407 displays thereon information. When the host server 4 is initiated, the CPU 403 reads a program stored in the external storage apparatus 402 comprised of a disk apparatus and the like on the memory 401, and the read program is executed by the CPU 403 so as to execute a predetermined processing. It should be noted that such a storage apparatus as an SAN and an NAS may be alternatively employed instead of the disk apparatus employed in the host server 4.

A program which is read on the memory 402 stores in a database a process condition for each of the sensor nodes 1, which is received from the user terminal 5, and another process condition for each of the sensor nodes 1, which is accepted from the keyboard 406. Then, when the host server 4 acquires an ID of a new sensor node 1 from the PAN management server 2, the host server 4 reads a process condition of a sensor node 1 corresponding to the acquired ID from the database, and then, transmits the read process condition to the PAN management server 2 of the transmission source. In addition, the host server 4 stores an event received from the PAN management server 2, and executes predetermined action when the received event satisfies a predetermined process condition.

(Function of Sensor Node)

In the sensor node 1, when a time period (measuring time interval) previously set to the timer 104 has elapsed, the timer 104 issues an interrupt to the CPU 103 so as to initiate the CPU 103 in a sleep status.

The CPU 103 drives the sensor 107 so as to measure an environment, and transmits the measured environmental information as an observed event to the PAN management server 2. When the communication between the CPU 103 and the PAN management server 2 is accomplished, the CPU 103 stops the respective units of the sensor node 1 except the timer 104, and then, is advanced to a sleep status (131).

By repeatedly carrying out the above-mentioned processing, the CPU 103 is initiated in the predetermined observation interval (for example, 5 minutes) so as to execute an acquisition of observed information and a transmission of an event, so that the sensor node 1 can intermittently transmit the observed event. When the observed event is transmitted, the sensor node 1 requests a join (joined event) with respect to the PAN management server 2, the PAN management server 2 permits the join request of the relevant sensor node 1, and then, the sensor node 1 transmits an event containing the observed information. It is so assumed in this specification that the term joined event indicates such an event which is previously set so that this event is to be transferred from the PAN management server 2 to the host server 4 in order to accept setting of a transmission rule. For example, in a case where the sensor node 1 enters into an area managed by the PAN management server 2, a join request transmitted by the sensor node 1 in order to be connected to the PAN or first sensing data sent out from a sensor node 1 which is not managed by the PAN management server 2 may be understood as the joined event to execute a processing.

(Function of PAN Management Server)

Figure 6:
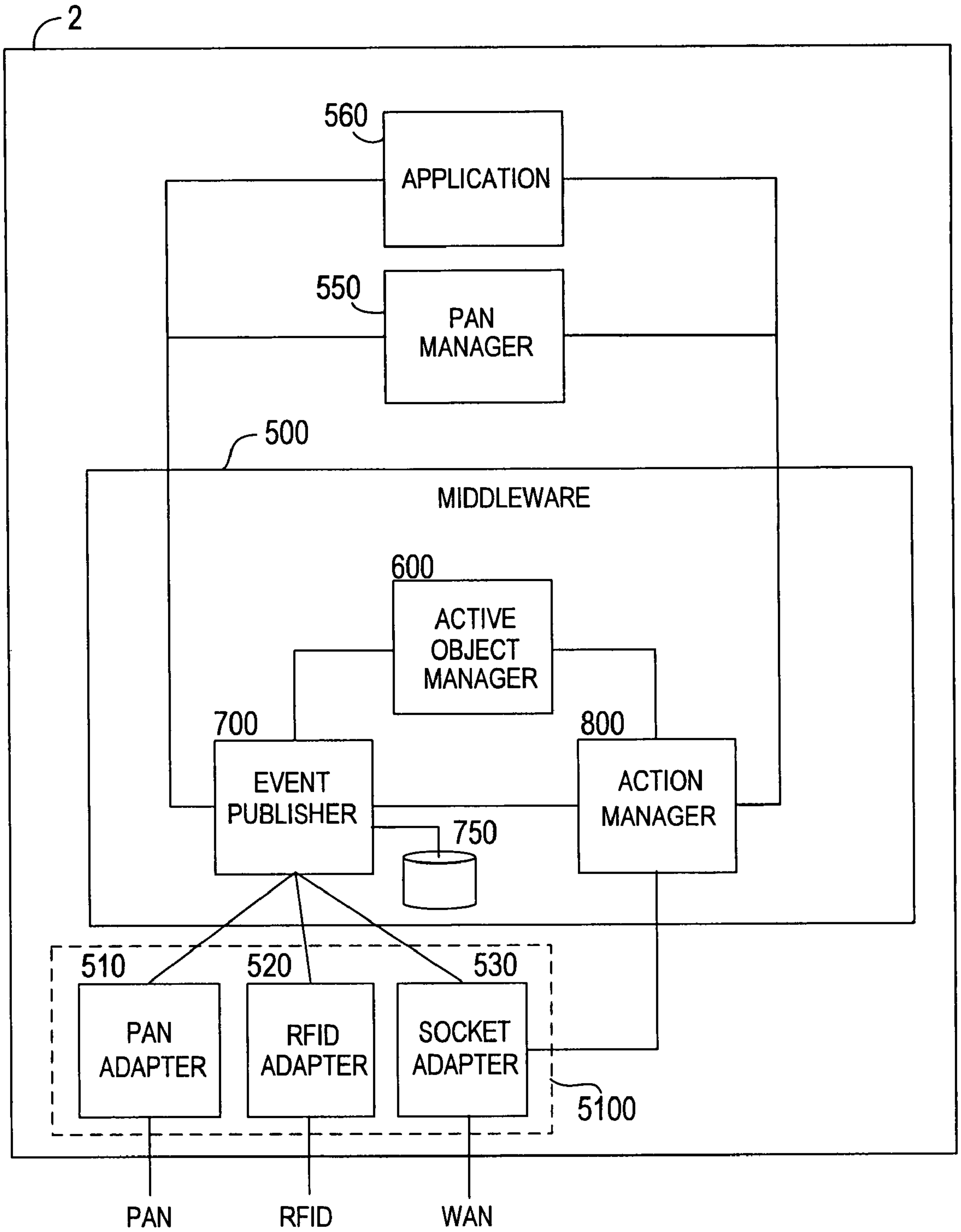
FIG. 6 is a block diagram for showing a software structure of the PAN management server according to the first embodiment.

As shown in FIG. 6, in the PAN management server 2, a PAN adapter 510, an RFID adapter 520, a WAN adapter 530, a middleware 500, a PAN manager 550, and an application 560 are executed. The PAN adapter 510 receives an event from the sensor node 1 via the PAN 6, and transmits a command to the sensor node 1. The RFID adapter 520 communicates with the RFID tag 11 via the RFID reader 12. The WAN adapter 530 communicates via the WAN 7 with the host server 4 and the user terminal 5. The middleware 500 processes events and signals, which are transmitted from and received by the respective adapters 510 to 530. The PAN manager 550 manages the PAN 6 based upon the signals and the events, which are processed by the middleware 500. The application 560 executes a predetermined processing based upon the events and the signals which are processed by the middleware 500. It should be noted that the PAN adapter 510, the RFID adapter 520, and the socket adapter 530 for performing the communication is generally called an event source 5100.

The middleware 500 includes an event publisher 700 for transmitting an event based upon a transmission rule, an action manager 800 for executing a command, and an object manager 600 for managing data such as an ID of a warehouse.

The middleware 500 detects participation and leaving of a new sensor node 1 based upon an observed event received from the sensor node 1 and an event from the timer 204 of the PAN management server 2, and then, notifies the detected action to the PAN manager 550. The PAN manager 550 manages the sensor node 1 connected to the PAN 6 under management based upon a notification from the middleware 500.

Accordingly, the event publisher 700 of the middleware 500 includes a PAN management table 750 which manages the sensor node 1 under management. It should be noted that the PAN manager 550 refers to the PAN management table 750 via the event publisher 700 so as to execute a management of the sensor node 1 under management. As shown in FIG. 8, the PAN management table 750 constitutes one entry including an ID portion 751 for storing thereinto the ID of the sensor node 1, and a transmission rule storage portion 752 for storing thereinto a transmission condition of an observed event. In the PAN management table 750, an entry is set for each of the IDs of the sensor nodes 1 connected under the PAN management server 2, and the PAN manager 550 can manage the sensor node 1 under management by referring to the PAN management table 750. It should be noted that such a transmission rule that when an observed temperature exceeds 20° C., the observed temperature is transferred to the host server 4 corresponds to information acquired from the host server 4, while the transmission rule has been set to the transfer rule storage unit 752.

(Function of Host Server)

The host server 4 holds a transmission rule and an action rule for each of the sensor nodes 1 which are inputted from the user terminal 5, a transmission rule and an action rule which are entered by using the input apparatus such as the keyboard 406 by an administrator and the like, and an observed event received from the PAN management server 2.

Figure 7:
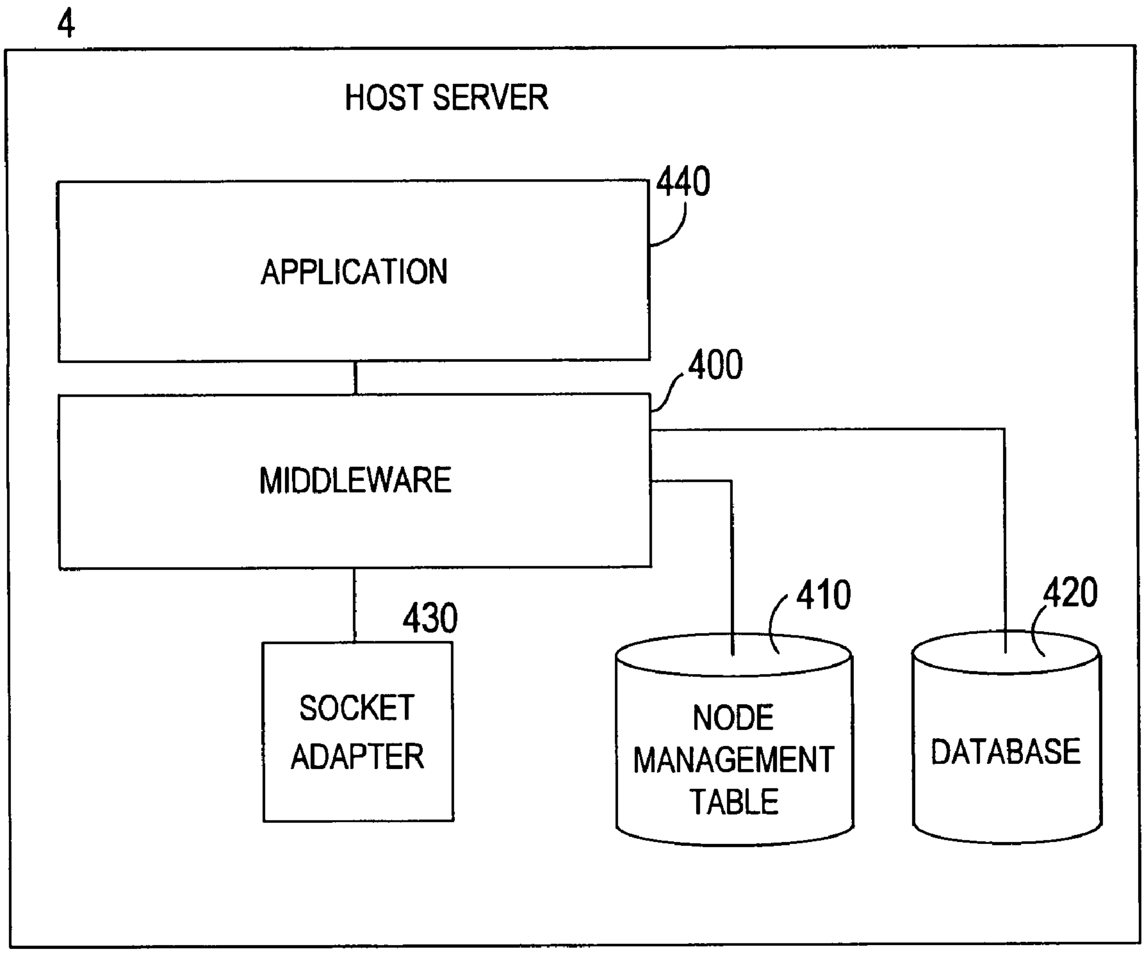
FIG. 7 is a block diagram for showing a software structure of the host server according to the first embodiment.

As indicated in FIG. 7, the host server 4 executes a socket adapter 430, a middleware 400, and an application 440. The socket adapter 430 communicates with the PAN management server 2. The middleware 400 executes a predetermined processing as to an event received by the socket adapter 430. The application 440 provides a predetermined service to the user terminal 5.

The middleware 400 receives a transmission rule and an action rule for every ID of the sensor node 1 from the user terminal 5, the keyboard 406, and the like, and then, stores the received transmission/action rules in the node management table 410. Then, when the middleware 400 receives a joined event from the PAN management server 2, the middleware 400 searches the node management table 410 based upon the sensor node 1 of the joined event, and notifies a preset transmission rule to the PAN management server 2. Also, the middleware 400 sets information (for example, identifier or location) of the PAN management server 2 which transmits the joined event to the node management table 400 so as to manage a location of each of the IDs of the sensor nodes 1, namely locations of containers including the sensor nodes 1.

When the middleware 400 receives an observed event from the PAN management server 2, the middleware 400 stores the received event to the database 420. Also, when an observed event satisfies a condition defined by an action rule, the middleware 400 executes a processing defined by the action rule.

The application 440 retrieves information in the node management table 410 and searches the database 420 in response to a request issued from the user terminal 5.

In this case, as shown in FIG. 9, the node management table 410 managed by the middleware 400 constitutes one entry including an ID portion 411 for storing IDs of the sensor nodes 1, a transmission rule storage portion 412 for storing transmission conditions (transmission rules) of observed events, an action rule storage portion 413 which defines conditions of processings executed by the host server 4 and contents of the processings, and a positional information storage portion 414 which indicates locations of the sensor node 1. While identifiers capable of specifying the sensor nodes 1 are stored in the ID portion 411, global unique identifiers such as MAC addresses may be employed. In the positional information storage portion 414, either location information or an identifier of the latest PAN management server 2 which has communicated with the relevant sensor node 1 is set.

The example of the figure shows a case where the MAC addresses are employed as the IDs of the sensor nodes 1. In this example, with respect to an observed event of such a sensor node 1 that the ID portion 411 indicates the MAC address=00:11:22:33:44:55, the following transmission rule is set to the transmission rule storage portion 412. That is, if the observed temperature exceeds 20° C., the observed event is transmitted to the host server 4. Further, the following action rule is set to the action rule storage portion 413. That is, if the observed temperature exceeds 30° C., warning is notified to the user terminal 5. Further, such a fact that a sensor node 1 having an identifier of "00:11:22:33:44:55" is located in the warehouse #2 is indicated in the positional information storage portion 414.

(Outline of Processings of Sensor Network)

Figure 10:
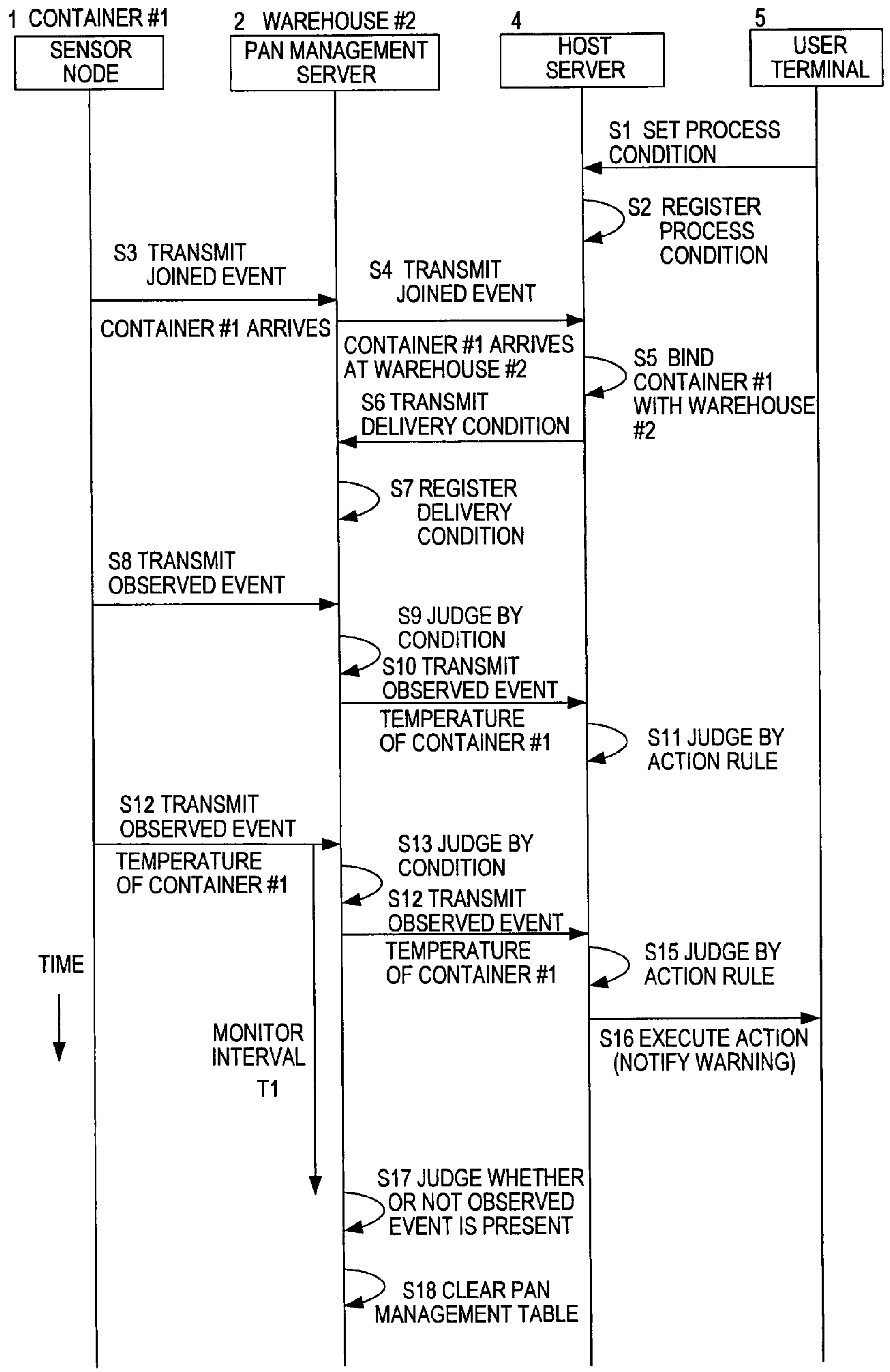
FIG. 10 is a time chart for showing a processing flow executed among a sensor node, the PAN management server, the host server, and a user terminal from arrivement of the sensor node to unbinding of an event according to the first embodiment.

Referring to a flow chart of FIG. 10, a description is made of an example of processings executed among the sensor node 1, the PAN management server 2, the host server 4, and the user terminal 5.

When a sensor node 1 is used, first, both a transmission rule for transmitting an observed event of the sensor node 1 from the user terminal 5 to the host server 4 and an action rule which is executed in the host server 4 are set (S1). The user terminal 5 transmits, as a process condition, an ID (00:11:22:33:44:55) of the sensor node 1, a transmission rule, and an action rule with respect to the middleware 400. Next, when the host server 4 receives the process condition corresponding to the ID of the sensor node 1, the middleware 400 sets both the transmission rule and the action rule which constitute the process condition in the node management table 410 in correspondence with the ID of the sensor node 1 (S2). Further, such a rule has been previously stored in the PAN management server 2 in correspondence with node IDs of the sensor nodes 1. That is, if data received from the sensor node 1 is a joined event, the joined event is transferred to the host server 4, and if data received from the sensor node 1 is an observed event, then the observed event is stored in the memory 201 or discarded. Regarding to setting of the rule, the rule may be notified from the host server 4, or may be previously set in an initial stage.

The sensor node 1 is set to the container 10 and is delivered by a vehicle. For instance, such an example that the container 10 including the sensor node 1 moves from the warehouse #1 and arrives at the warehouse #2 will be described.

The sensor node 1 is initiated in a predetermined time period and transmits a joined event with respect to the PAN management server 2 of the warehouse #2 (S3). The PAN management server 2 which has received the joined event acquires the ID (00:11:22:33:44:55) of the sensor node 1 contained in the joined event so as to search the PAN management table 750 with respect to this ID. Then, when the ID of the relevant sensor node 1 is not present in the PAN management table 750, the PAN management server 2 judges that a new sensor node 1 (container 10) arrives, and transfers a joined event to the host server 4 based upon the above-mentioned preset rule (S4). The joined event which is transmitted to the host server 4 includes information made by adding the identifier (for example, ID=2) of the PAN management server 2 to the above-mentioned joined event received by the PAN management server 2 from the sensor node 1. After the joined event is transmitted to the host server 4, the PAN management server 2 adds the ID (00:11:22:33:44:55) of the sensor node 1 to the PAN management table 750. It should be noted that, as the ID of the PAN management server 2, an IP address or a MAC address may be alternatively employed.

The host server 4 which has received the joined event of the new sensor node 1 from the PAN management server 2 acquires the ID (00:11:22:33:44:55) of the sensor node 1 and the ID (ID=2) of the PAN management server 2 from the received joined event. The host server 4 refers to a table (not shown) based upon the ID=2 of the PAN management server 2 which has transmitted the joined event, and determines that the positional information of the sensor node 1 is the warehouse #2. Then, the host server 4 retrieves the ID (00:11:22:33:44:55) of the sensor node 1 from the node management table 410, and sets the determined positional information to the positional information storage portion 414 of the node management table 410 so as to bind the position of the container 10 to the warehouse #2 (S5). As shown in FIG. 1, in the case where the container 10 moves from the warehouse #1 to the warehouse #2, in the positional information storage portion 414 corresponding to the ID of the sensor node 1, the positional information "warehouse #1" is updated to "warehouse #2." In order to determine the positional information based upon the ID of the PAN management server 2, a relationship between the identifiers of the PAN management servers 2 and the positional information may be previously set in a table or the like.

Next, the host server 4 acquires the transmission rule (transmit when temperature exceeds 20° C.) from the node management table 410 corresponding to the ID of the sensor node 1 contained in the joined event, and then transmits the acquired transmission rule to the PAN management server 2 of the warehouse #2 which has transmitted the joined event (S6). It should be noted that, in this embodiment, the searching is carried out in correspondence with the node ID of the sensor node 1, but this invention is not limited thereto. Alternatively, any transmission rule may be determined in correspondence with the received joined event. For instance, a transmission rule may be set for each PAN. In this case, a method for storing the transmission rules in the host server 4 may be changed.

The PAN management server 2 stores the transmission rule (transmit when temperature exceeds 20° C.) received from the host server 4 in the transmission rule storage portion 752 of the entry of the ID (00:11:22:33:44:55) added in the above-mentioned step S4 to the PAN management table 750 (S7). Subsequently, when the PAN management server 2 receives an observed event from the sensor node 1 whose ID is 00:11:22:33:44:55, the PAN management server 2 can execute the transmission when the condition of the transmission rule is satisfied.

Next, after the sensor node 1 transmits the joined event in the above-mentioned step S3, the status of the sensor node 1 is advanced to a sleep status. Then, in a step S8, since a predetermined time period elapses, the sensor node 1 is again initiated, and the sensor 107 executes an observation, and the sensor node 1 transmits an observed event to the PAN management server 2 (S8).

The PAN management server 2 which has received the observed event from the sensor node 1 acquires such a transmission rule (transmit when temperature exceeds 20° C.) from the transmission rule storage portion 752 of the PAN management table 750 based upon the ID of the sensor node 1 so as to compare the observed event with the transmission condition (S9). In a case where the observed value of the observed event is 21° C., since this observed event satisfies the transmission condition, the PAN management server 2 transmits the observed event to the host server 4 (S10). If the observed event cannot satisfy the transmission condition, the PAN management server 2 discards the observed event.

The host server 4 which has received the observed event from the PAN management server 2 searches the node management table 410 based upon the ID (00:11:22:33:44:55) of the sensor node 1 contained in the observed event so as to acquire such an actin rule (notify warning when temperature exceeds 30° C.) from the action rule storage portion 412 of the corresponding ID. Then, the host server 4 compares an observed value of the observed event with the condition of the action rule (S11). In this example, since the observed value is 21° C., this observed value cannot satisfy the execution condition of the action, so that the host server 4 does not execute the action. It should be noted that the host server 4 stores the received observed event in the database 420 in correspondence with the ID of the sensor node 1.

Next, after the sensor node 1 transmits the observed event, the status of the sensor node 1 is advanced to a sleep status, and then, after the elapse of a predetermined time period, the sensor node 1 is again initiated, and the sensor node 1 transmits an observed event to the PAN management server 2 (S12). In this case, it is so assumed that the observed value of the observed event is 31° C. In a step S13, similarly to the above-mentioned operation of the step S9, the PAN management server 2 judges a transmission condition based upon the transmission rule, and then, transmits the observed event to the host server 4, since the observed value is 31° C., namely, the observed value satisfies the transmission condition (S14).

Similarly to the above-mentioned step S11, the host server 4 which has received the observed event acquires an action rule so as to judge an execution condition of the action under the observed value=31° C. (S15). Since the observed value satisfies the execution condition, the host server 4 executes the action set to the action rule storage portion 412, and transmits warning for indicating that the temperature exceeds a predetermined value to the user terminal 5.

In this case, by transmitting a joined event, the sensor node 1 can notify such a fact that a communication is newly performed to the PAN management server 2. However, when the container 10 leaves the warehouse #2, the PAN management server 2 cannot receive the notification from the sensor node 1.

As a consequence, the PAN management server 2 causes the timer 204 to count from a time instant when the observed event is received from the sensor node 1 for a predetermined monitoring time period T1 (for example, 10 minutes), and if the PAN management server 2 has not received the observed event from the same sensor node 1 at a time instant when the monitoring time period T1 has elapsed, the PAN management server 2 judges that the sensor node 1 (container 10) has left the management of this PAN management server 2.

In other words, in FIG. 8, every time the PAN management server 2 receives the observed event from the sensor node 1, the timer 204 starts counting until the predetermined monitoring time period T1 elapses. For instance, when the timer 204 starts counting in the step S8, the sensor node 1 transmits the observed event in the step S12 before the monitoring time period T1 passes. After this observed event is received, the PAN management server 2 again starts counting by using the timer 204.

When the container 10 leaves the warehouse #2 and then is moved outside a communication range of the PAN management server 2, the PAN management server 2 cannot receive the observed event from the sensor node 1, and the monitoring time period T1 passes. At this time, the PAN management server 2 judges whether or not the observed event from the same sensor node 1 is received (S17). If the observed event from the same sensor node 1 has yet to be received within the monitoring time period T1, the PAN management server 2 deletes the entry stored in the PAN configuration table 750, while this entry corresponds to the ID of the sensor node 1 apart from the warehouse #2 (S18). In this case, the PAN management server 2 may notify the ID of the sensor node 1 separated from the management with respect to the host server 4. In this case, the host server 4 which has received the notification may delete the positional information 414 from the entry of the node management table 410, which corresponds to the ID of the sensor node 1, or may add an identifier whose connection is released.

As previously described, the PAN management server 2 which has sensed the new sensor node 1 transmits such information as an observed event to the host server 4, while the information includes the ID of the own PAN management server 2 in the ID of this new sensor node 1. Then, the host server 4 searches the node management table 410 based upon the ID of the sensor node 1 of the joined event so as to transmit the corresponding transmission rule to the PAN management server 2. The PAN management server 2 monitors an observed event received from the sensor node 1 under the transmission condition contained in the transmission rule received from the host server 4, and can transmit the observed event when the transmission condition is established.

As a consequence, in the sensor network system which manages the containers 10 by using the sensor nodes 1, by merely setting to the host server 4, the transmission rule and the action rule for each of the sensor nodes 1 (containers 10) from the user terminal 5 the transmission rule can be transmitted to an arbitrary PAN management server 2. While the administrator and the like need not grasp the transport path and the present position of the container 10 (sensor node 1), both the transmission rule and the action rule may be merely set with respect only to the host server 4. Also, the host server 4 transmits the transmission rule of the relevant sensor node 1 only to the PAN management server 2 where the sensor node 1 arrives, and the transmission condition is judged by the PAN management server 2. As a result, only the necessary information can be transmitted to the user terminal 5 and the like, so that it is possible to avoid that the entire communication amount of the sensor network system becomes excessively large. Also, only the transmission rule of the sensor node 1 which is presently joined may be merely stored in the PAN management server 2. As a result, the resources of the memory and the like in the PAN management server 2 can be effectively utilized.

(Processings of PAN Management Server)

Figure 11:
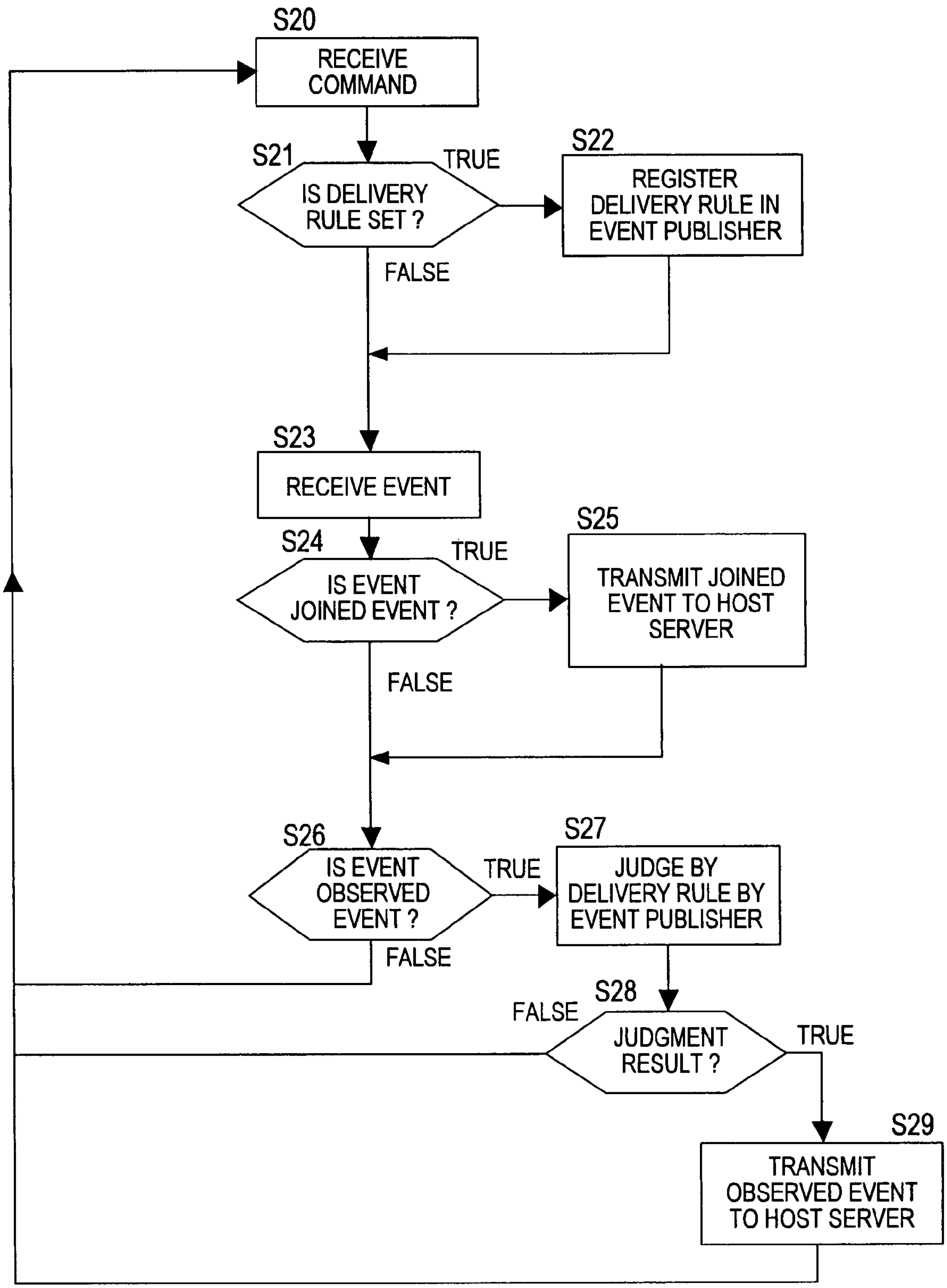
FIG. 11 is a flow chart for showing an example of processings executed in the PAN management server according to the first embodiment.

Next, an example about processings executed in the PAN management server 2 will be described with reference to a flow chart of FIG. 11. When a received content is a command (S20), the PAN management server 2 judges whether or not the received command corresponds to a transmission rule setting command sent from the host server 4 (S21). When the transmission rule setting command is received, the processing is advanced to a step S22 in which an ID of a sensor node 1 and a transmission rule are added to the PAN management table 750 of the event publisher 700.

When the PAN management server 2 receives an event from the sensor node 1 (S23), the PAN management server 2 judges whether or not the received event corresponds to a joined event sent from the sensor node 1 (S24). If the received event corresponds to the joined event, the PAN management server 2 transmits the joined event to the host server 4 (S25). On the other hand, if the received event is not the joined event, the PAN management server 2 judges whether or not the received event corresponds to an observed event (S26). When the received event corresponds to the observed event, the PAN management server 2 acquires a transmission rule corresponding to the ID of the sensor node 1 contained in the observed event, and then judges whether or not the value of the observed event satisfies the transmission condition of the transmission rule (S27 and S28). When the value of the observed event satisfies the transmission condition, the PAN management server 2 transmits such an observed event to the host server 4, while this observed event is produced by adding the ID of the own PAN management server 2 to the observed event sent from the sensor node 1 (S29). In this case, if the corresponding transmission rule has yet to be set, the transmission rule has yet to be recognized and managed by the host server 4. As a result, the PAN management server 21 stores the acquired observed event in the memory, or discards the event in accordance with the setting condition.

It should be noted that the PAN management server 2 may be merely adapted to three kinds of the processings defined in the above-mentioned steps S21, S23, and S26. However, sequences of these processings are not limited only to this first embodiment.

As indicated in FIG. 10, in order to sense such a sensor node 1 which has left the PAN management server 2 and cannot communicate, when the PAN management server 2 receives the observed event in the above-mentioned step S26, the PAN management server 2 initiates the timer 204 so as to count until to the predetermined monitoring time period T1 elapses. When the monitoring time period T1 elapses, the timer 204 issues an interrupt (disjoined event) to the CPU 203 so as to start an interrupt processing. In this interrupt processing, the PAN management server 2 judges whether or not an observed event is received from such a sensor node 1 which is identical to the sensor node 1 which has received the observed event in the step S26 during the monitoring time period T1. If the observed event is received during the monitoring time period T1, the PAN management server 2 judges that the relevant sensor node 1 is located within the communication range. On the other hand, in such a case where the observed event is not received from the same sensor node 1, the PAN management server 2 judges that the sensor node 1 has been moved outside the communication range of the PAN management server 2. Then, the entry having the ID of the relevant sensor node 1 is deleted from the PAN management table 750, and then, the interrupt processing is accomplished.

In the PAN management server 2, since the above-mentioned processings are repeatedly carried out, the transmission rule is transmitted to the PAN management server 2 where the sensor node 1 arrives, and the containers 10 can be monitored under such a condition set by the transmission rule. Also, in the case where the observed event is received, the PAN management server 2 can execute the predetermined action when the value of the received observed event satisfies the execution condition of the action rule.

(Processings of Host Server)

Figure 12:
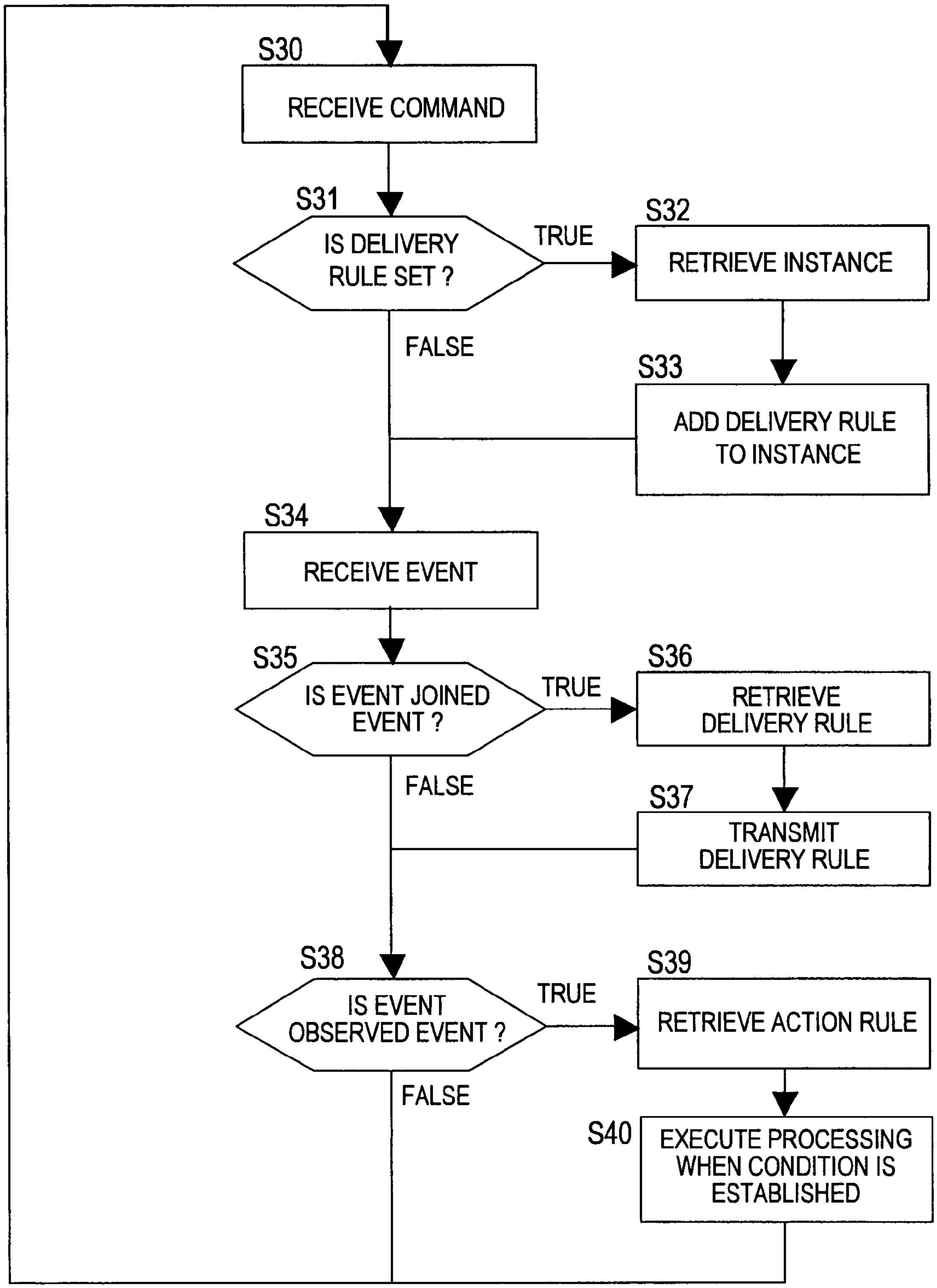
FIG. 12 is a flow chart for showing an example of processings executed in the host server according to the first embodiment.

Referring to a flow chart of FIG. 12, a description is made of an example of processings executed by the middleware 400 of the host server 4. When a content received by the host server 4 is a command (S30), the host server 4 judges whether or not the received command corresponds to a transmission rule setting command from the user terminal 5 (S31). When the received command is the transmission rule setting command, the processing is advanced to a step S32 in which the host server 4 retrieves an ID of a sensor node 1 contained in the transmission rule setting command from the node management table 410 ("retrieves instance" in the drawing). If there is no relevant ID in the node management table 410, the host server 4 adds a new entry, and sets an ID of the new sensor node 1 to the ID portion 411. Then, the host server 4 sets a transmission rule to the transmission rule storage portion 412 (S33), and an action rule to the action rule storage portion 413. On the other hand, if there is the relevant ID in the node management table 410, the host server 4 updates the transmission rule storage portion 412 or the action rule storage portion 413 of this entry.

In the case that the received content is an event (S34), the host server 4 judges whether or not the received event corresponds to a joined event sent from the PAN management server 2 (S35). When the received event is the joined event, the host server 4 searches the node management table 410 based upon an ID of a sensor node 1 contained in the relevant joined event so as to acquire a transmission rule from the entry of this ID (S36). Then, the host server 4 transmits the acquired transmission rule to such a PAN management server 2 which has transmitted the joined event (S37). It should be noted that the host server 4 determines a location of the sensor node 1 from the ID of the PAN management server 2, which is contained in the joined event, and then, stores the determined location in the positional information 414 of the node management table 410.

Next, the host server 4 judges whether or not an event received from the PAN management server 2 corresponds to an observed event (S38). When the received event is the observed event, the host server 4 searches the node management table 410 based upon the ID of the sensor node 1 contained in this observed event so as to retrieve an action rule from the entry of the relevant ID (S39). Then, the host server 4 judges an execution condition of the action based upon the acquired action rule, and executes a processing designated by the action rule when the value of the observed event satisfies the execution condition (S40).

The host server 4 repeatedly executes the above-mentioned processings, whereby the host server 4 can transmit the transmission rule accepted from the user terminal 5 to the PAN management server 2 where the sensor node 1 arrives, and can monitor the container 10 under such a condition set by the transmission rule. Also, in such a case where the observed event is received, the host server 4 can execute a predetermined action when the value of the observed event satisfies the execution condition of the action rule.

(Detailed Contents of PAN Management Server)

Next, a description is made of a structure of software which constructs the PAN management server 2.

(Event Publisher)

Figure 13:
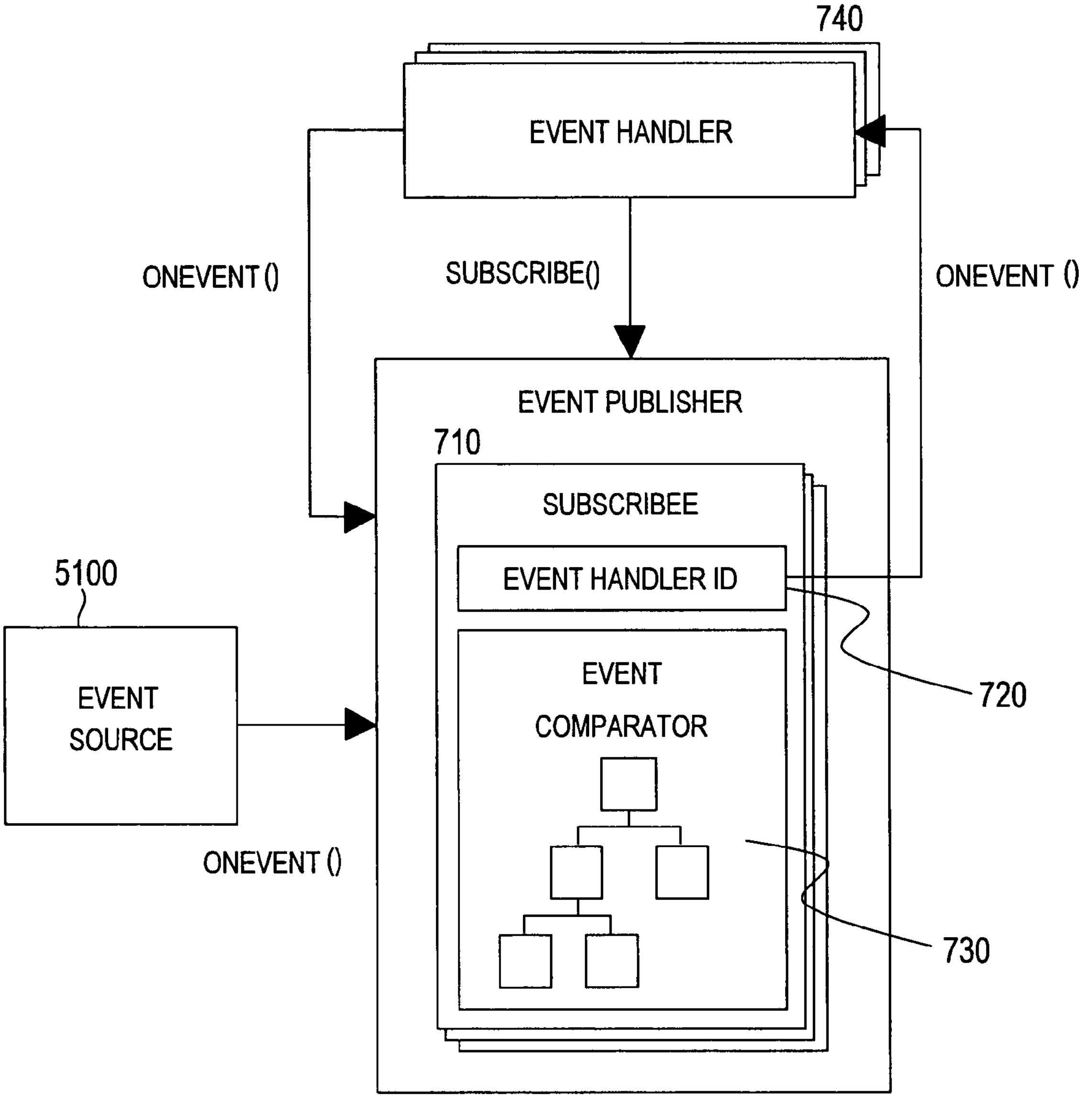
FIG. 13 is a block diagram for showing a configuration of an event publisher of the PAN management server according to the first embodiment.

FIG. 13 shows a detailed structure of the event publisher 700 indicated in FIG. 6. The event publisher 700 includes a subscribee 710 containing an event handler ID 720 and an event comparator 730. The event handler ID 720 indicates a transmission destination of an event with respect to each sort of event ("onEvent" shown in FIG. 13) which is entered from an event source 5100 (input from respective adapters). The event comparator 730 defines an event issue condition.

When a condition designated by the event comparator 730 can be satisfied, the event publisher 700 issues an event with respect to an event handler 740 set to the event hander ID 720. The event handler 740 instructs the event publisher 700 to issue (scribe) an event to a previously set transmission destination. Then, the event publisher 700 issues the event based upon the instruction of the event handler 740. It should be noted that the event handler 740 is implemented in, for example, the PAN manager 550.

As shown in FIG. 16, the event publisher 700 issues such primary events as a joined event, a disjoined event, and an observed event; and also issues secondary events. Also, as shown in FIG. 17, contents of the event comparator 730 includes a comparator which performs a comparing operation as to a single event, and a composite comparator which compares events with each other under a plurality of conditions.

For instance, when the event publisher 700 accepts the joined event from the event source 5100, the event comparator 730 of the event publisher 700 compares conditions with each other, and then, the event publisher 700 issues ("onEvent" in the figure) the joined event to the event handler 740 which is designated by the event handler ID 720. The event handler 740 notifies (subscribes) a transfer destination of the event to the event publisher 700 in accordance with the accepted event.

Also, the event publisher 700 can issue a new event under such a condition that no event is supplied from the event source 5100. For example, in a "not" comparator shown in FIG. 17, if an observed event cannot be received from an ID of a predetermined sensor node 1 even after a predetermined time period elapses, a disjoined event can be issued.

(PAN Manager)

Figure 14:
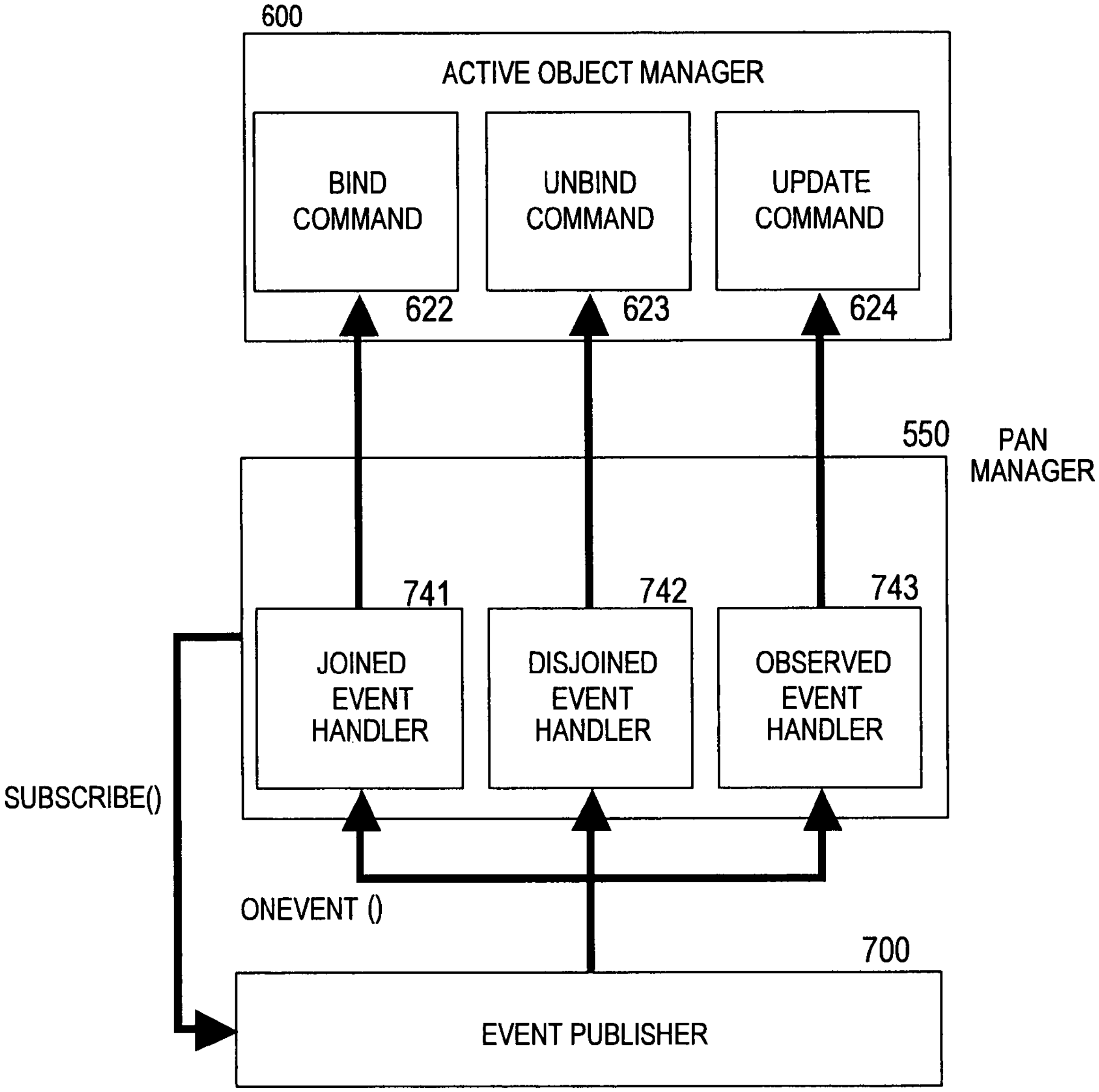
FIG. 14 is a block diagram for showing a configuration of a PAN manager of the PAN management server according to the first embodiment.

FIG. 14 is a block diagram for showing a structure of a PAN manager 550. The PAN manager 550 manages a newly joined event, a disjoined event, and an observed event as to a sensor node 1 under management. Accordingly, the PAN manager 550 contains as the event handler 740, a joined event handler 741, a disjoined event handler 742, and an observed event handler 743.

Upon receipt of a joined event, the PAN manager 550 initiates the joined event handler 741 so as to transmit a bind command for indicating that the new joined event is supplied with respect to the active object manner 600. Then, the joined event handler 741 instructs the event publisher 700 to transmit the joined event with respect to a predetermined transmission destination (for example, host server 4).

Also, when the PAN manager 550 accepts a disjoined event, the PAN manager 550 initiates the disjoined event handler 742 so as to send an unbind commend for indicating that the connection is disjoined with respect to the active object manager 600. Then, the disjoined event handler 742 instructs the event publisher 700 to transmit the disjoined event with respect to a predetermined transmission destination (for example, host server 4).

Also, when the PAN manager 550 accepts an observed event, the PAN manager 550 initiates the observed event handler 743 so as to send an observed command for indicating that the observed event is accepted with respect to the active object manager 600. Then, the observed event handler 743 instructs the event publisher 700 to transmit the disjoined event with respect to a predetermined transmission destination (for example, host server 4). In this case, if the value of the observed event is a temperature, the event comparator 730 of the event publisher 700 compares the observed temperature with a condition which has been previously set to the observed event, and when the observed temperature satisfies the preset condition, the PAN manager 550 executes a predetermined processing. For instance, the PAN manager 550 may be set as follows. That is, based upon such a condition that if the temperature of the observed event exceeds 30° C. ("getParam" shown in FIG. 17), transmission is executed, only when the value of the observed event satisfies the predetermined condition, the PAN manager 550 transmits the observed event to the host server 4 or the like.

The event publisher 700 can perform various sorts of processings such as an event for processing such an event accepted in conjunction with the event handler 740 is initiated. Assuming that an event accepted from the event source 5100 is a primary event, the event publisher 700 transmits the primary event to the host server 4. Alternatively, the event publisher 700 transmits a secondary event obtained by processing the primary event to the host server 4.

Figure 18:
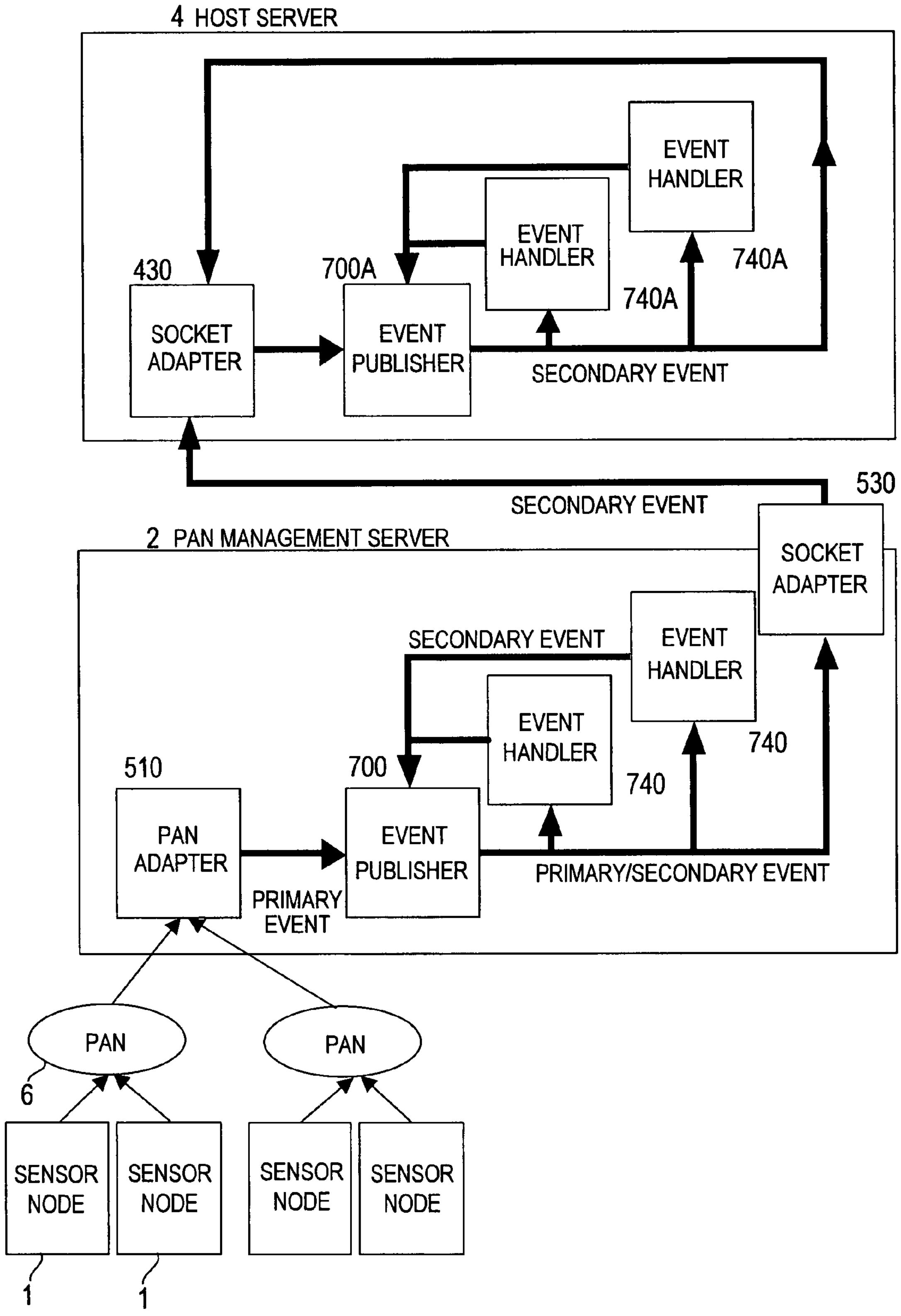
FIG. 18 is an explanatory diagram for showing a transfer system of an event from the PAN management server to the host server according to the first embodiment.

For example, in such a case where the middleware 400 of the host server 4 shown in FIG. 7 includes the event publisher 700 similarly to the middleware 500 of the PAN management server 2, events are transmitted as shown in FIG. 18. An observed event from the sensor node 1 is received by the PAN adapter 510, and then, this observed event is inputted as the primary event in the event publisher 700 of the PAN management server 2. The event publisher 700 notifies the arrival of the observed event to the event handler 740. Then, the event handler 740 instructs a transmission destination of the event to the event publisher 700. In this case, the event publisher 700 transmits the observed event to the host server 4 as the secondary event. Alternatively, the event handler 740 may call such an event that a predetermined unit (centigrade) is added to a value of an observed event, process the observed event to obtain a secondary event, and transmit the secondary event form the socket adapter 530 to the host server 4.

The host server 4 enters the secondary event received from the socket adapter 430 into the event publisher 700A, and then, the secondary event may be again processed in the event handler 740A of the host server 4. Alternatively, the secondary event may be transmitted to another computer (for example, user terminal 5).

(Active Object Manager)

Figure 15:
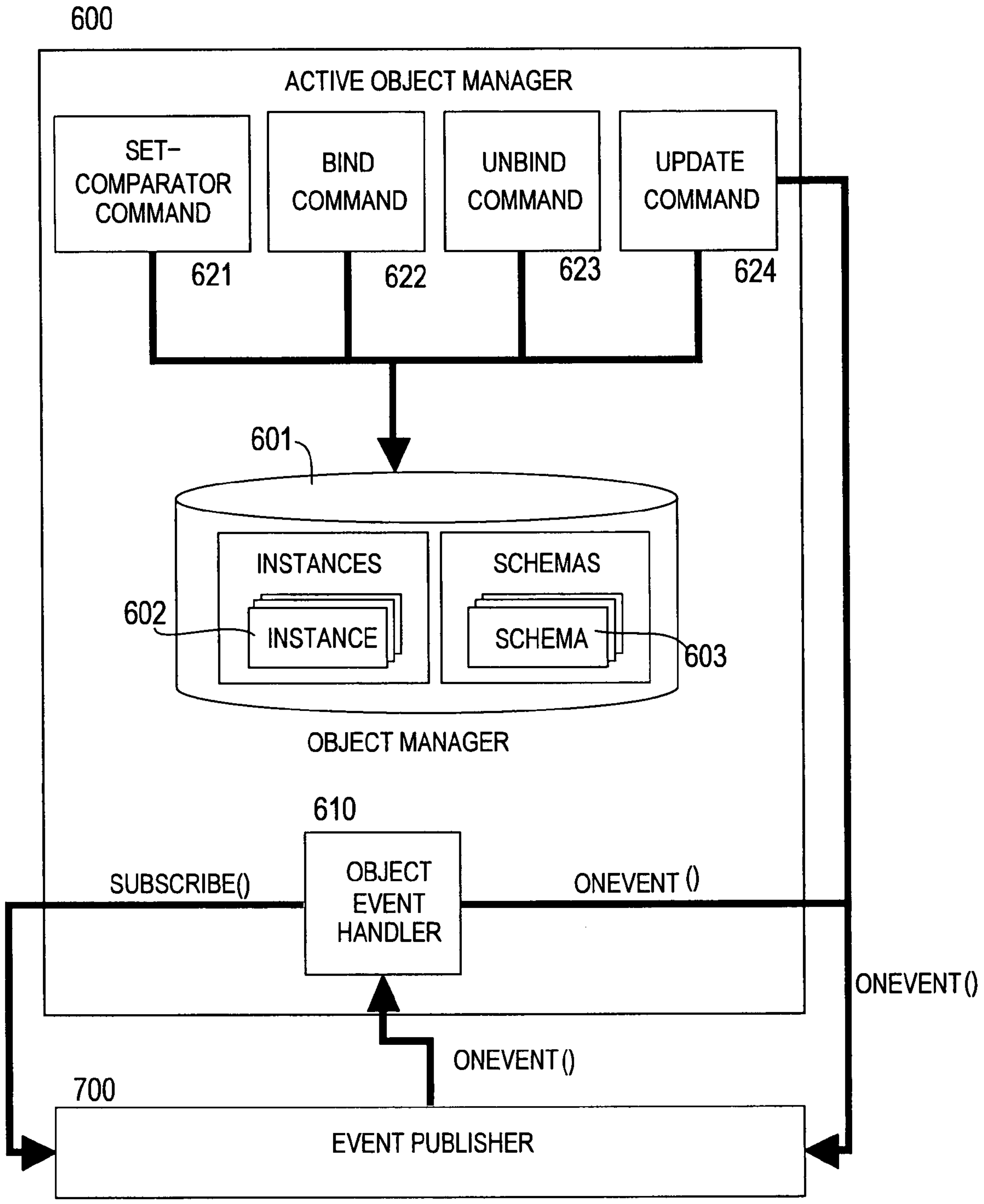
FIG. 15 is a block diagram for showing a configuration of an active object manager of the PAN management server according to the first embodiment.

FIG. 15 shows an example of the active object manager 600 which manages data of the PAN management server 2. The above-mentioned event publisher 700 and PAN manager 550 refer to data stored in an object manager 601 of the active object manager 600 in order to issue and transmit an event, or to manage the sensor node 1 under management.

The object manager 601 includes an instance 602 which stores thereinto a substance of data, and a schema 602 which designates a structure of the data. While information of the sensor nodes 1 and information of the container 10 have been stored in the object manager 601, the above-mentioned event handlers 740 (741 to 743) acquire data from the object manager 600 via an object event hander 610.

Also, the active object manager 600 accepts commands transmitted from the PAN manager 550, the event publisher 700, and the like and performs processings (observe and update) with respect to the object manager 601. Examples of the above-mentioned command include a set comparator command 621, a bind command 622, an unbind command 623, an update command 624, and the like. The set comparator command 621 is to set or update a transmission rule. The bind command 622 is to bind the transmission rule with a new sensor node 1. The unbind command 623 is to unbind binding of the transmission rule with the disjoined sensor node 1. The update command 624 is to update an observed temperature.

FIG. 19 exemplifies data of some kinds which are managed by the object manager 601. As to a schema 603, an attribute thereof is defined by a schema property, and a schema name of a bind destination is defined by referring to the schema.

As to an instance 602, rules (condition of event comparator 730) which have the own IDs and are to update the instance 602 are defined by a subscribe rule, and a processing content related to the instance 602 is defined by an action rule.

Figure 20:
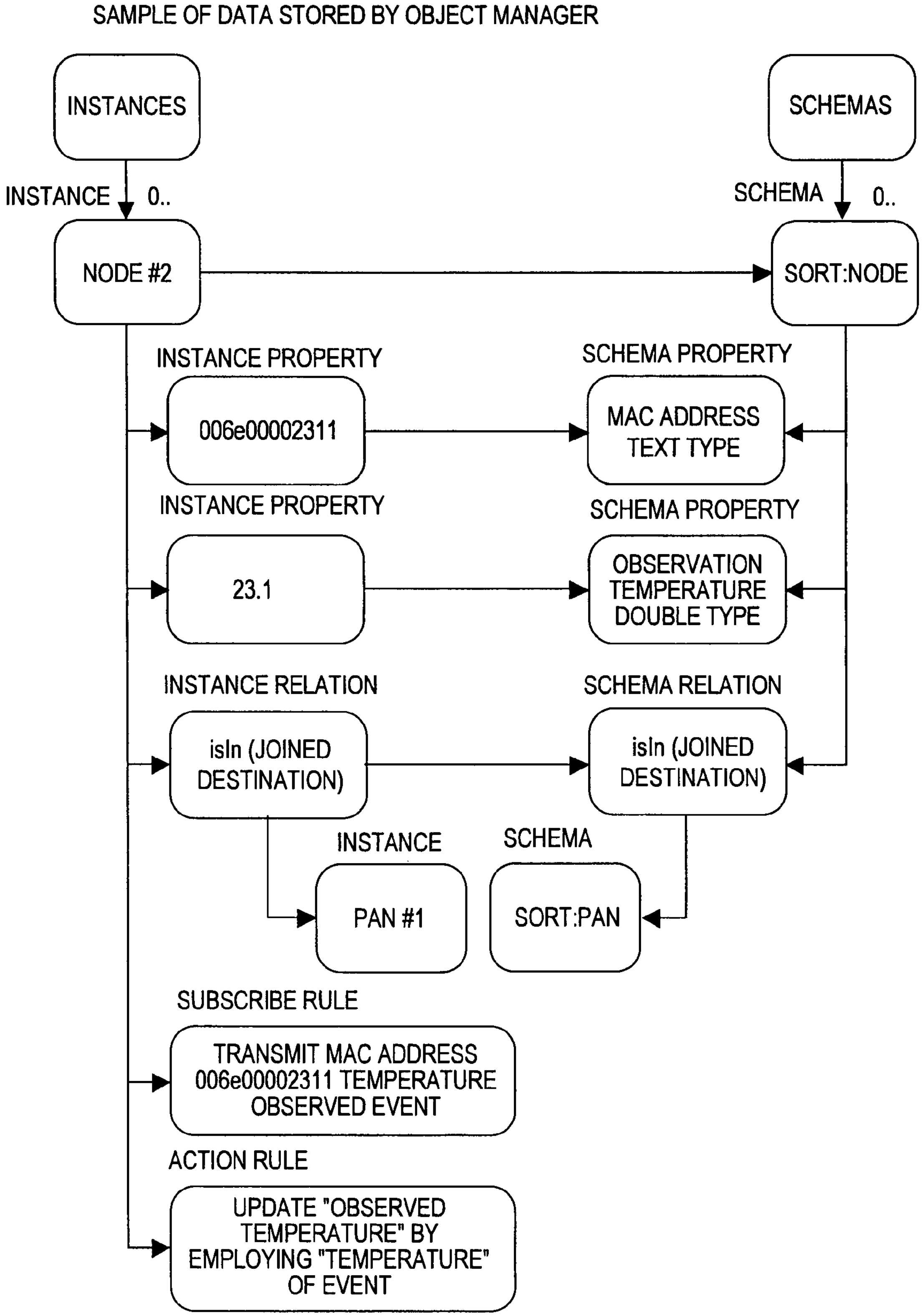
FIG. 20 is an explanatory diagram for showing an example of instances and schemas managed by the object manager of the PAN management server according to the first embodiment.

FIG. 20 shows one concrete example of the data managed by the object manager 600. FIG. 20 indicates data and a data structure of such a sensor node 1 having ID=2. Both a text type MAC address and an observed temperature of 23.1° C. are stored in the instance property in a double data format, and "PAN#1" is stored in a joined destination. Further, a rule for transmitting an observed event of a MAC address 006e00002311 is defined in a schema rule, whereas a rule for updating the observed temperature of the instance property based upon "temperature" of the observed event is defined in a schema rule.

FIG. 21 shows an example in which the definition of the above-mentioned schema 603 is expressed by the XML language. FIG. 21 indicates a definition of such a sensor node 1 under management by the PAN management server 2. An ID of the sensor node 1 is defined by an MAC address, and FIG. 21 shows that the observed value is a temperature.

Next, in FIG. 22, an example in which the definition of the instance 602 is expressed by the XML language is indicated. FIG. 22 describes ID=2of the sensor node 1 joined to the PAN management server 2. This example represents that based upon a description, path="isIn/PAN", if the sensor node 1 having ID=2 is joined to PAN 6, EC1 indicated in this drawing is executed.

EC1 shown in this drawing is described by an event comparator, and defines such a condition that if the observed event=observed is reached, then the observed event is transferred.

Next, as an action rule, such a rule is defined in which if an event containing "temperature" is reached, an observed temperature is updated.

Next, FIG. 23 shows sorts of commands which are provided by the object manager 601. When a new sensor node 1 is joined to the object manager 601, the object manager 601 provides a bind command for binding a transmission rule acquired from the host server 4, and an unbind command for unbinding binding between a transmission rule and an ID of a sensor node 1 connected when the sensor node 1 is disjoined.

Figure 24:
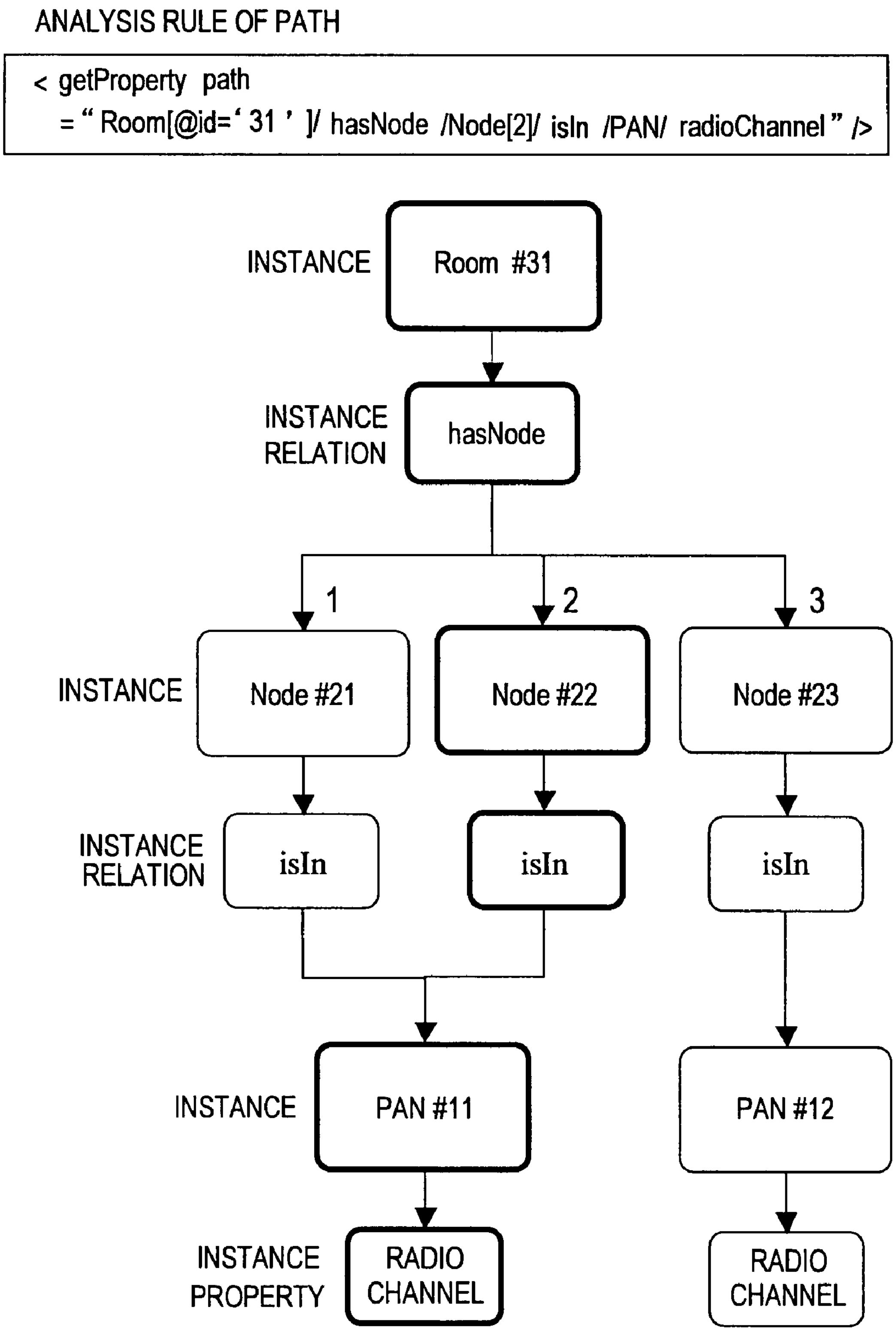
FIG. 24 is an explanatory diagram for showing an example of paths managed by the object manager of the PAN management server according to the first embodiment.

FIG. 24 represents an example in which a communication channel of a second sensor node 1 in a warehouse #31 is analyzed by an attribute acquisition (getproperty) command shown in FIG. 23. This analysis example indicates that the ID=22 of the sensor node 1 is joined to ID=11 of the PAN management server 2 in a tree structure.

(Detailed Contents of Processings)

Figure 25:
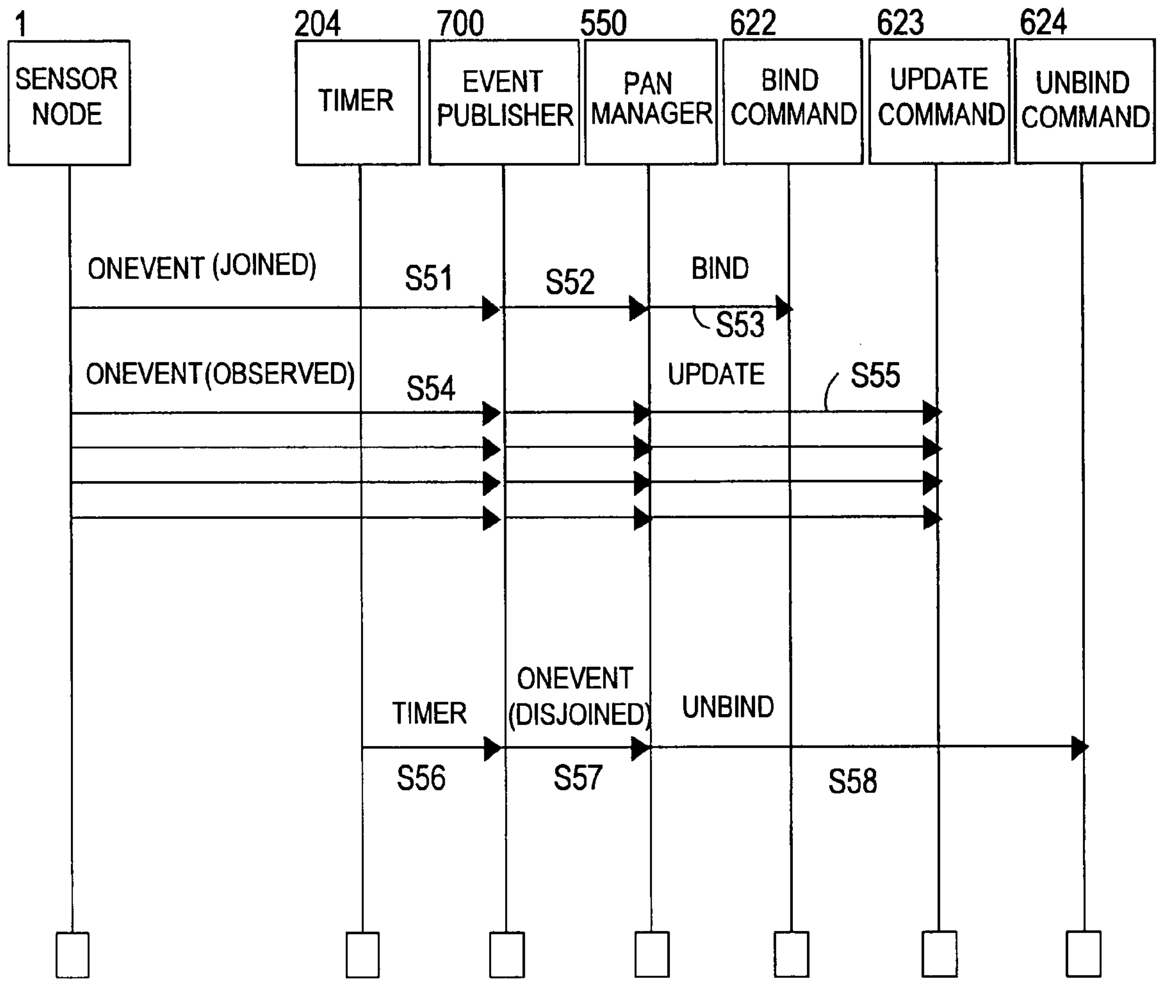
FIG. 25 is a time chart for showing an example of events published by the PAN management server when a sensor node is bound according to the first embodiment.

A detailed description is made of processings which are mainly performed by the PAN management server 2. FIG. 25 represents sequential processings from joining of the sensor node 1 indicated in the steps S3 to S8, S17, and S18 of FIG. 8, up to a reception of an observed event and disjoining of the sensor node 1.

The sensor node 1 is initiated in a predetermined time period, and transmits a joined event with respect to the PAN management server 2 of the warehouse #2 (S51). In the PAN management server 2 which has received the joined event, the event publisher 700 issues the joined event with respect to the PAN manager 550 (S52), and the PAN manager 550 issues a bind command 622 shown in FIG. 14 (S53). As will be described later, the event publisher 700 notifies an arrival of a new sensor node 1 to the host server 4, and acquires a transmission rule from this host server 4. Then, the transmission rule acquired from the host server 4 is registered as the instance 602 in the object manager 601 of the active object manager 600 which has received the bind command 622.

After the processing of the joining has been accomplished, the event publisher 700 receives an observed event from the sensor node 1 (S54). The event publisher 700 which has received the observed event transmits the observed event to the PAN manager 550, and the PAN manager 550 sends an update command 624 to the active object manager 600 (S55). The object manager 601 which has received the update command 624 updates the observed temperature of the instance 602 at the temperature of the observed event.

When the container 10 leaves the warehouse #2 and the sensor node 1 is moved outside the communication range of the PAN management server 2, the PAN management server 2 cannot receive the observed event from the sensor node 1, but the monitoring time period T1 elapses in the timer 204. The timer 204 transmits a disjoined event to the event publisher 700 (S56). The event publisher 700 transmits the disjoined event to the PAN manager 550 (S57). The PAN manager 550 transmits an unbind command 623 to the active object manager 600 based upon the disjoined event. In the active object manager 600, the instance 602 of the joined sensor node 1 is deleted from the instance 602 of the object manager 601.

Within a time period from the commencement of joining of the sensor node 1 until the observed event is received and the sensor node 1 is disjoined, the processing shown in FIG. 25 is carried out in the PAN management server 2.

Figure 26:
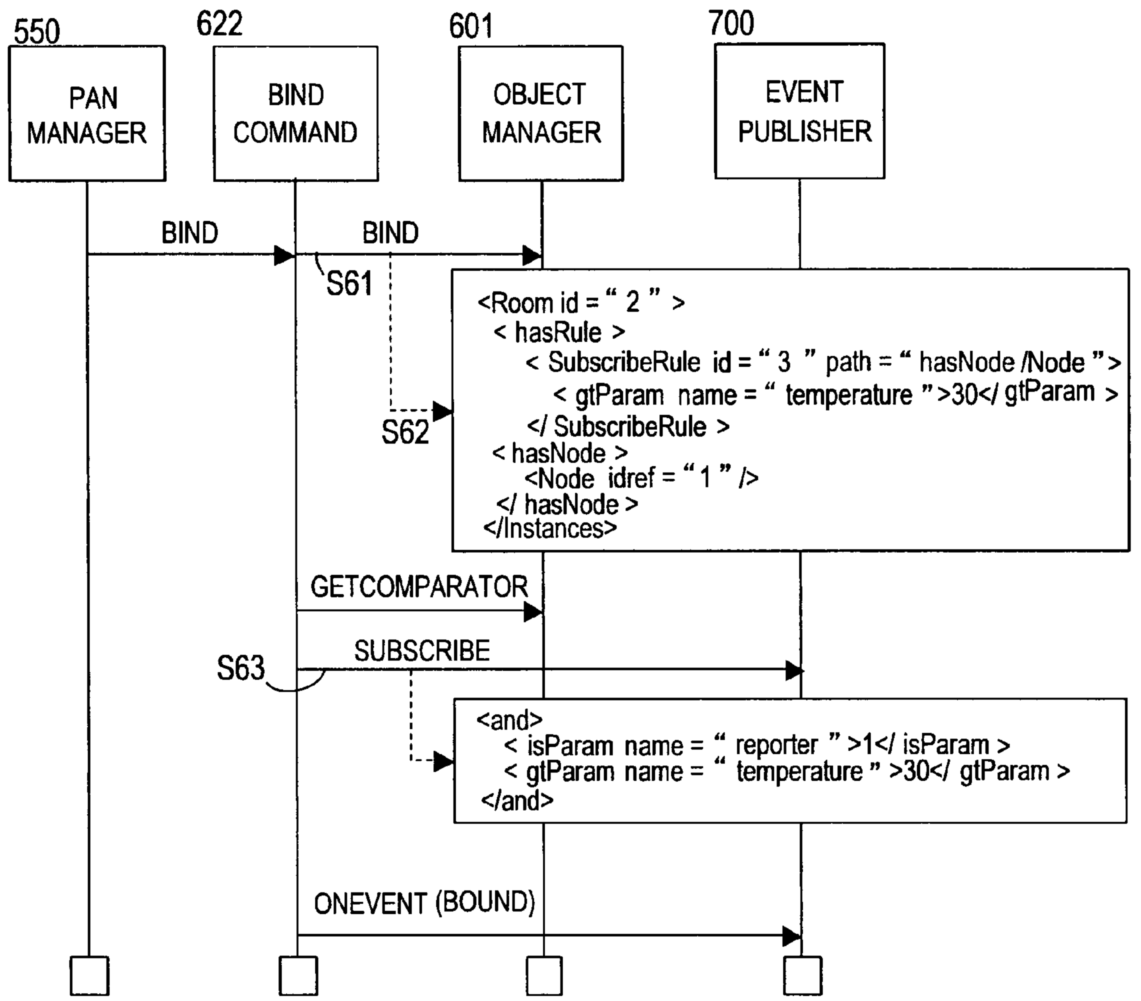
FIG. 26 is a time chart for showing another example of events published by the PAN management server when a sensor node is bound according to the first embodiment.

FIG. 26 represents processings of the PAN management server 2 when the sensor node 1 is newly joined, and indicates the above-mentioned processing of the step S7 shown in FIG. 10. At this time, in the step S6 of FIG. 10, the PAN manager 550 of the PAN management server 2 has received the transmission rule from the host server 4.

The PAN manager 550 issues a bind command 622 with respect to the active object manager 600 (S61), and transfers the transmission rule received from the host server 4 to the object manager 601 (S62). In this step, the object manager 601 binds a transmission rule acquired from the host server 4 with ID=1 of the newly joined sensor node 1, while this transmission rule defines "transmit if temperature exceeds 30° C".

From the bind command 622, such a command (getcomparator) for acquiring the comparator of the transmission rule is transmitted to the object manager 601, and a transmission command (subscribe) of the observed event is sent to the event publisher 700. The event publisher 700 acquires such a comparator "if temperature exceeds 30° C." corresponding to the transmission rule from the object manager 601, and then sets the acquired transmission rule to the description portion 710 which constitutes the event publisher 700. It should be noted that ID=3 of the sensor node 1 set by the object manager 601 is set to the event handler ID 720.

In accordance with the above-mentioned processings, the following definition is set. That is, if the value of the observed event transmitted from the sensor node 1 having ID=1 exceeds 30° C., then the event publisher 700 transmits the observed event.

Figure 27:
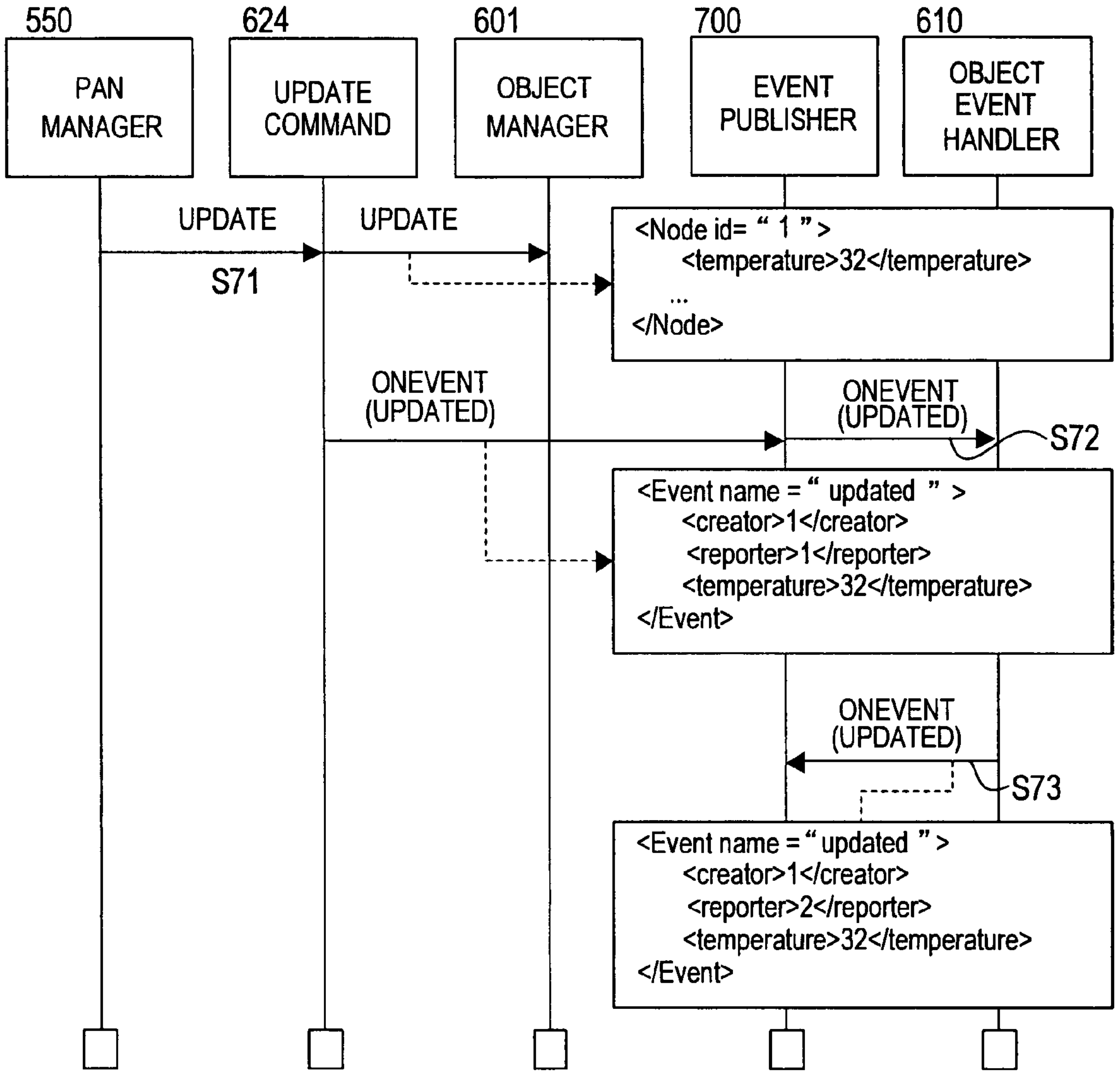
FIG. 27 is a time chart for showing an example of events published by the PAN management server when an observed event is received according to the first embodiment.

FIG. 27 shows an example in which an observed event from the sensor node 1 having ID=1 is received. When the PAN manager 550 receives an observed event sent from the sensor node 1, the PAN manager 550 issues an update command 624 to the object manager 601 so as to update the instance 602 of the ID of the relevant sensor node 1 (S71).

The event publisher 700 notifies such a fact that the observed temperature of this sensor node 1 is updated to the object event handler 610 which manages the container 10 (S72). The object event handler 610 transmits such an ID obtained by replacing the ID (=1) of the sensor node 1 by the ID (=2) of the container 10 to the event publisher 700 (S73).

As a consequence, in the event publisher 700, the temperature of the observed event which is detected by the sensor node 1 can be handled as the temperature of the container 10. In other words, if the observed event acquired from the sensor node 1 is assumed as the primary event, the event publisher 700 can issue such a secondary event that the temperature contained in the observed event is defined as the temperature of the container 10.

Second Embodiment

Figure 28:
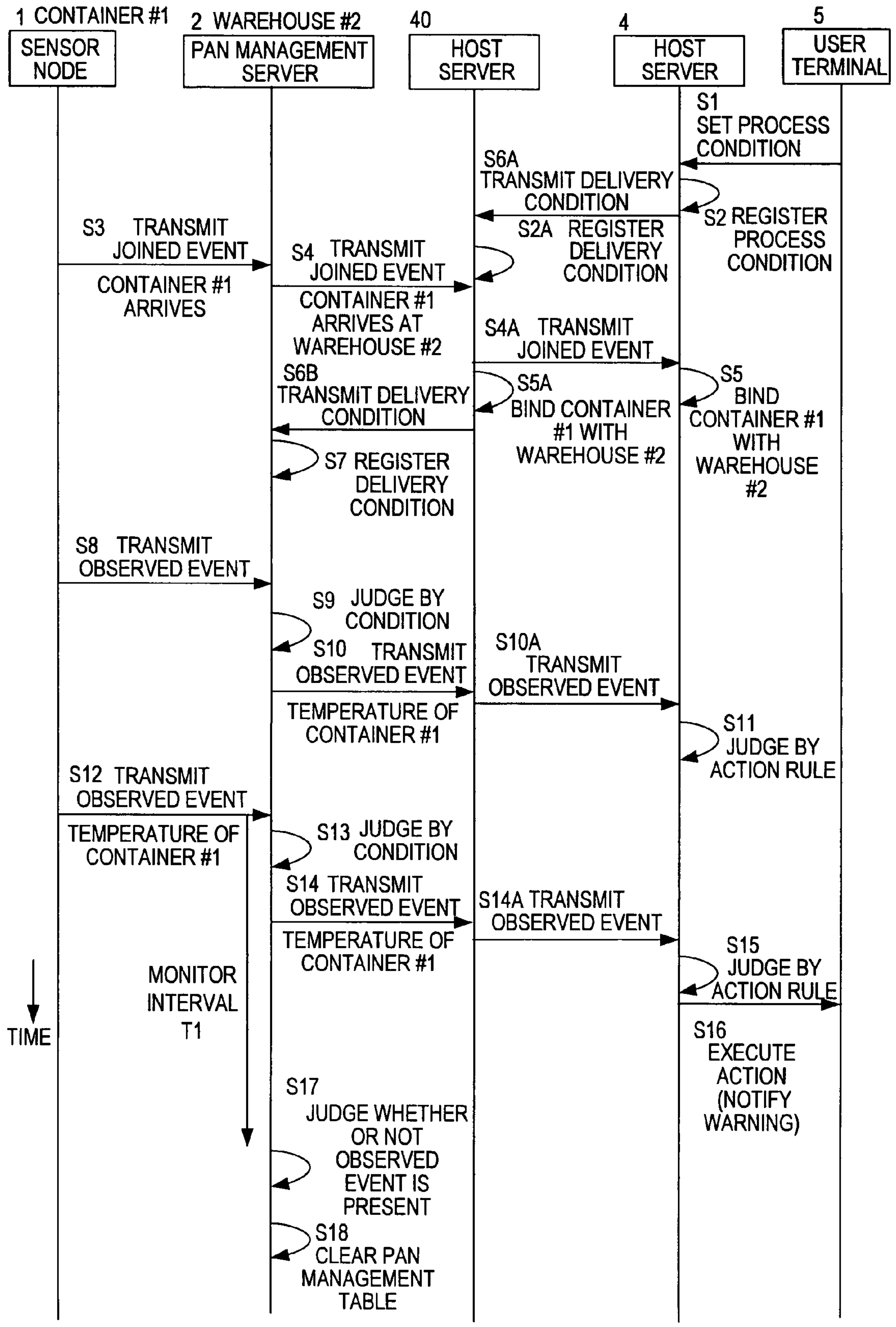
FIG. 28 is a time chart for showing a processing flows executed among a sensor node, a PAN management server, a second host server, a host server, and a user terminal from arrivement of the sensor node to unbinding of an event according to a second embodiment of this invention.

FIG. 28 shows a second embodiment of this invention. A host server is configured in a multilayer structure in which, between the above-mentioned host server 4 and PAN management server 2 of the first embodiment, a second host server 40 is provided. Other structures are similar to those of the first embodiment. The second host server 40 stores thereinto transmission rules, and repeats events and commands. In the second embodiment, management information of events can be shared by the host servers 4 and 40 configured in two-layer.

In the second embodiment, a transmission rule is held in the second host server 40. When a joined event is sent from the sensor node 1, the second host serve 40 transmits the transmission rule to the PAN management server 2. In other words, in such a case where the PAN management server 2 does not grasp the location of the host server 4 and cannot directly transmit the joined event to the host server 4, the PAN management server 2 transmits the joined event to the known second host server 40, so that the second host server 40 transmits the transmission rule previously acquired from the host server 4 to the PAN management server 2.

On the other hand, the second host server 40 transmits an observed event of the PAN management server 2 to the host server 4. Similarly to the first embodiment, when the observed event satisfies a predetermined condition, the host server 4 executes action.

Similarly to the host server 4 shown in FIG. 7, the second host server 40 includes a node management table 410. It should be noted in the second embodiment that there are some possibilities that the second server 40 does not execute action. In this case, it is so assumed that the second host server 40 does not use the action rule 413 stored within the node management table 410.

A transmission rule and an action rule are set to the host server 4 from the user terminal 5, and then, the host server 4 registers the transmission rule and the action rule in the node management table 410 (S1 and S2).

Next, before the joined event is reached from the PAN management server 2, the host server 4 transmits the transmission rule to the second host server 40, and then, the second host server 40 registers the received transmission rule in the node management table 410 (S6A and S2A). At this time, when the host server 4 is joined to the second host server 40, the host server 4 transmits the transmission rule. Alternatively, after the second host server 40 requests the host server 4 to join, the host server 4 may transmit the transmission rule to the host server 40.

When the PAN management server 2 receives a joined event from the sensor node 1, the PAN management server 40 transmits the joined event to the second host server 40 (S4). The second host server 40 transmits the received joined event to the host server 4 (S4A). Both the host server 4 and the second host server 40 write positional information about the arrival of this joined event in the node management table 410 in order to grasp a positional relationship between the container 10 and a warehouse (S5 and S5A).

Then, the second host server 40 transmits the transmission rule of the sensor node 1 which has been bound with respect to the position of the warehouse to the PAN management server 2 which has transmitted the joined event (S6B). Similarly to the first embodiment, the PAN management server 2 stores the transmission rule in the PAN management table 750, and upon reception of an observed event, the PAN management server 2 transmits the received observed event to the second host server 40 (S7 to The second host serve 40 directly transmits the observed event to the host server 4 (S10A and S14A). The second host server 40 merely transmits the observed event to the host server 4, whereby the host server 4 judges the action rule similarly to that of the first embodiment, and when the condition is established, the host server 4 executes predetermined action (for example, transmit warning to user terminal 5) (S16).

The host servers 4 and 40 are configured in a hierarchical manner so as to separate the transmission of the transmission rule from the execution of the action rule, whereby, when a large-scaled sensor network system is configured, it is possible to avoid that the load given to the host server 4 becomes heavy. For instance, in such a case where the purpose of the host servers 4 and 40 is to manage only joining of containers and warehouses, it is sufficient for the host servers 4 and 40 to merely receive joined events. However, there is an effective merit when an observed event is transferred to the host appliance based upon needs of the host server 4.

Also, in the second embodiment, the host server 40 may store the transmission rule in combination with a transmission rule specific to the second host server 40, and may transmit the specific transmission rule to the PAN management server 2. In particular, in a case where the sensor nodes 1 to be managed are overlapped with each other between the host servers 4 and 40, in accordance with the configuration of the second embodiment, among the observed events received by the host server in the above-mentioned steps S10, S14, and the like, a selection of an event is carried out in accordance with the transmission rule of the host server 4, and then, only the selected observed event is transferred to the second host server 40 (S10A and S14A). As a result, processing loads given to the host server 4 can be reduced. Concretely, the sensor node system of the second embodiment may be applied to the following case. That is, while the second host server 40 merely manages such a condition that a temperature of a warehouse is within 15 to 30° C., the host server 4 merely manages such a condition that the temperature thereof is equal to or higher than 40° C. in order to manage emergent events.

Also, in the second embodiment, the user terminal 5 may merely set the desirable transmission rule and the desirable action rule to the host server 4, so that the process condition can be readily set without paying an attention to the location of the sensor node 1.

CONCLUSION

As previously described, in accordance with the first embodiment and the second embodiment, when the observed value of the sensor node 1 connectable with any one of a large number of the PAN management servers 2 (repeating apparatuses) is monitored, the transmission rule of the observed value and the action rule in response to the observed value may be merely set from the user terminal 5 to the host server 4. As a result, the process condition can be set extremely easily without paying attention to the location of this sensor node 1. That is, as to the sensor node 1 (container 10) which is sensed by the PAN management server 2 which manages the warehouses, either the host server 4 or the second host server 40 transmits the transmission rule to the PAN management server 2. As a result, when the container 10 is managed, the condition required for the container management can be previously transmitted without paying attention to the location of this container 10. Also, when the transmission rule is required to be changed, setting contents of the host server 4 may be merely changed, while the location of the container 10 (sensor node 1) is not specified.

Also, since the transmission rule is applied to the PAN management server 2 which directly communicates with the sensor node 1, such an observed event which is not necessary for the user is not transmitted to the host server 4 and the second host server 40. As a result, the loads given to the network and the host servers which constitute the sensor network system can be reduced.

In the first embodiment, the transmission rule and the action rule are set from the user terminal 5, but those rules may be alternatively set via the keyboard 406 and the display 407 of the host server 4. For instance, when the middleware 400 of the host server 4 accepts a notification about a new sensor node 1, the middleware 400 may display an ID and positional information (warehouse number etc.) of the new sensor node 1 on the display 407 so as to inquire a transmission rule and an action rule of an administrator or a user, and then may set information entered from the keyboard 406 and the like as the transmission rule and the action rule.

Also, in the first embodiment, when the PAN management server 2 satisfies the transmission rule, the PAN management server 2 transmits the observed event to the host server 4. In such a case where the IDs of the containers 10 are managed by the node management table 410 of the host server 4, the PAN management server 2 may alternatively send such a secondary event to which an ID of a container 10 instead of the ID of the sensor node 1 is attached as the observed event.

Also, in the first embodiment, the PAN management server 2 manages the container 10 based upon the ID of the sensor node 1 stored in the PAN management table 750. Alternatively, while the ID of the sensor node 1 may be bound with the ID of the container 10, the PAN management server 2 may manage the transmission rule based upon the ID of the container 10.

As previously described, this invention can be applied to such a sensor network system including sensor nodes which can move among a large number of PAN management servers. More specifically, this invention can be applied to such a physical distribution system in which statuses of articles under transportation and service statuses thereof are wanted to be monitored.

While the present invention has been described in detail and pictorially in the accompanying drawings, the present invention is not limited to such detail but covers various obvious modifications and equivalent arrangements, which fall within the purview of the appended claims.

What is claimed is:

1. A sensor network system, comprising:

a client apparatus including a sensor node for transmitting an event based upon information observed by a sensor; and an intermediate apparatus for receiving the event from the sensor node and transmitting the received event to a host computer, a connection relation between the client apparatus and the intermediate apparatus being variably determined, wherein the host computer includes:

a node management table for managing a sensor node ID and a transmission condition in correspondence between the client apparatus and the intermediate apparatus;

a transmission condition setting unit for storing a transmission condition which is used to transmit only an observed event satisfying a preset condition to the host computer from the event received by the intermediate apparatus from the client apparatus;

a transmission condition transmitting unit for extracting a transmission condition determined based upon a joined event from the transmission condition setting unit and transmitting the transmission condition to the intermediate apparatus which has transmitted the joined event when the joined event is received from the intermediate apparatus, the transmission condition corresponding to the sensor ID contained in the joined event from the node management table; and an observed value storage unit for storing thereinto the observed event when the observed event satisfying the transmission condition is received from the intermediate apparatus, wherein the intermediate apparatus includes:

an event judging unit for judging whether the event received from the client apparatus corresponds to one of the joined event to be transferred to the host computer and the observed event to be one of stored and discarded in a storage apparatus of the intermediate apparatus;

a join starting unit for transmitting the joined event to the host computer when the joined event is received; and a transmission condition managing unit for storing, when a transmission condition corresponding to the joined event is received from the host computer, the transmission condition in correspondence with an identifier of the client apparatus corresponding to the joined event, and wherein, when the event judging unit receives the observed event from the client apparatus, the event judging unit judges whether or not the observed event which was received satisfies the transmission condition corresponding to the identifier of the client apparatus, and transmits the observed event to the host computer when the observed event satisfies the transmission condition.

2. The sensor network system according to claim 1, wherein:

the transmission condition setting unit sets the transmission condition for each identifier of the client apparatus; and the transmission condition transmitting unit extracts a transmission condition corresponding to the identifier of the client apparatus of a transmission source of the joined event from the transmission condition setting unit.

3. The sensor network system according to claim 1, wherein the host computer further includes:

an action rule storage unit for previously setting an execution condition which is used to execute a predetermined processing when the observed event is received for each identifier of the client apparatus; and an action executing unit for acquiring, when the observed event is received from the intermediate apparatus, the execution condition from the action rule storage unit based upon the identifier of the client apparatus contained in the observed event, and executing the predetermined processing only when the observed event satisfies the execution condition.

4. The sensor network system according to claim 1, wherein the transmission condition setting unit stores the identifier of the client apparatus of a transmission source of the joined event in correspondence with an identifier of the intermediate apparatus which has transferred the joined event when the joined event is received.

5. The sensor network system according to claim 1, wherein the transmission condition setting unit stores an identifier of the intermediate apparatus which has transferred the joined event as positional information of the client apparatus of a transmission source of the joined event when the joined event is received.

6. The sensor network system according to claim 1, wherein the intermediate apparatus further includes a disjoining judging unit for judging disjoining of the client apparatus when an event cannot be received from a client apparatus set by the transmission condition managing unit even after an elapse of a predetermined time.

7. A sensor network system, comprising:

a client apparatus including a sensor node for transmitting an event based upon information observed by a sensor; and an intermediate apparatus for receiving the event from the sensor node and transmitting the received event to a host computer, a connection relation between the client apparatus and the intermediate apparatus being variably determined, wherein the host computer includes a second host computer for receiving an event from the intermediate apparatus and transferring the received event to a first host computer, wherein the first host computer includes:

a node management table for managing a sensor node ID and a transmission condition in correspondence between the client apparatus and the intermediate apparatus:

a transmission condition setting unit for storing a transmission condition which is used to transmit only an observed event satisfying a preset condition to the second host computer from the event received by the intermediate apparatus from the client apparatus;

a transmission condition transmitting unit for extracting, when a joined event is received from the second host computer, the transmission condition determined based upon the joined event from the transmission condition setting unit, and transmitting the extracted transmission condition to the second host computer, the transmission condition corresponding to the sensor ID contained in the joined event from the node management table; and an observed value storage unit for storing thereinto the observed event when the observed event satisfying the transmission condition is received from the second host computer, wherein the second host computer includes:

a second transmission condition setting unit for storing the transmission condition when the transmission condition is received from the first host computer; and a second transmission condition transmitting unit for extracting, when the joined event is received from the intermediate apparatus, a transmission condition determined based upon the joined event from the second transmission condition setting unit, and transmitting the extracted transmission condition to the intermediate apparatus which has transmitted the joined event, wherein the intermediate apparatus includes:

an event judging unit for judging whether the event received from the client apparatus corresponds to one of the joined event to be transferred to the second host computer and the observed event to be one of stored and discarded in a storage apparatus of the intermediate apparatus;

a join starting unit for transmitting the joined event to the second host computer when the joined event is received; and a transmission condition managing unit for storing, when a transmission condition corresponding to the joined event is received from the second host computer, the transmission condition in correspondence with an identifier of the client apparatus corresponding to the joined event, and wherein, when the event judging unit receives the observed event from the client apparatus, the event judging unit judges whether or not the observed event which was received satisfies the transmission condition corresponding to the identifier of the client apparatus, and transmits the observed event to the second host computer when the observed event satisfies the transmission condition.

8. The sensor network system according to claim 7, wherein:

the transmission condition setting unit sets the transmission condition for each identifier of the client apparatus;

the transmission condition transmitting unit extracts a transmission condition corresponding to the identifier of the client apparatus of a transmission source of the joined event from the transmission condition setting unit;

the second transmission condition setting unit sets the transmission condition for each identifier of the client apparatus; and the second transmission condition transmitting unit extracts a transmission condition corresponding to the identifier of the client apparatus of the transmission source of the joined event from the transmission condition setting unit.

9. The sensor network system according to claim 7, wherein the first host computer further includes:

an action rule storage unit for previously setting an execution condition which is used to execute a predetermined processing when the observed event is received for each identifier of the client apparatus; and an action executing unit for acquiring, when the observed event is received from the second computer, the execution condition from the action rule storage unit based upon the identifier of the client apparatus contained in the observed event, and executing the predetermined processing only when the observed event satisfies the execution condition.

10. A data management method for a sensor network, in which an event based upon information observed by a sensor is transmitted by a client apparatus including a sensor node to an intermediate apparatus, and the intermediate apparatus transmits the event received from the sensor node to a host computer, a connection relation between the client apparatus and the intermediate apparatus being variably determined, the host computer having a node management table for managing a sensor node ID and a transmission condition in correspondence between the client apparatus and the intermediate apparatus, the method comprising the steps of:

storing, by the host computer, the transmission condition for transmitting to the host computer only an observed event satisfying a preset condition from the event received from the client apparatus by the intermediate apparatus;

transmitting, by the host computer, when a joined event is received from the intermediate apparatus, a transmission condition determined based upon the received joined event to the intermediate apparatus which has transmitted the joined event, the transmission condition corresponding to the sensor ID contained in the joined event from the node management table;

judging, by the intermediate apparatus, whether the event received from the client apparatus corresponds to one of the joined event to be transferred to the host computer and the observed event to be one of stored and discarded in a storage apparatus of the intermediate apparatus;

transmitting, by the intermediate apparatus, the joined event to the host computer when the joined event is received;

storing, by the intermediate apparatus, when a transmission condition corresponding to the joined event is received from the host computer, the transmission condition in correspondence with an identifier of the client apparatus corresponding to the joined event in a transmission condition managing unit; and acquiring, by the intermediate apparatus, a transmission condition corresponding to the identifier of the client apparatus, and transmitting the observed event to the host computer only when the observed event satisfies the acquired transmission condition.

11. The data management method for a sensor network system according to claim 10, wherein:

the step of storing the transmission condition includes setting the transmission condition for each identifier of the client apparatus; and the step of transmitting the transmission condition to the intermediate apparatus which has transmitted the joined event includes extracting a transmission condition corresponding to the identifier of the client apparatus of a transmission source of the joined event from the stored transmission conditions.

12. The data management method for a sensor network system according to claim 10, further comprising the steps of:

previously setting, by the host computer, an execution condition which is used to execute a predetermined processing when the observed event is received for each identifier of the client apparatus; and acquiring, by the host computer, when the observed event is received from the intermediate apparatus, the execution condition based upon the identifier of the client apparatus contained in the observed event, and executing the predetermined processing only when the observed event satisfies the execution condition.

13. The data management method for a sensor network system according to claim 10, wherein the step of storing the transmission condition includes storing the identifier of the client apparatus of a transmission source of the joined event in correspondence with an identifier of the intermediate apparatus which has transferred the joined event when the joined event is received.

14. The data management method for a sensor network system according to claim 10, wherein the step of storing the transmission condition includes storing an identifier of the intermediate apparatus which has transferred the joined event as positional information of the client apparatus of a transmission source of the joined event when the joined event is received.

15. The data management method for a sensor network system according to claim 10, further comprising the step of:

judging, by the intermediate apparatus, disjoining of the client apparatus when an event cannot be received from the joined client apparatus even after an elapse of a predetermined time.

* * * * *

UNITED STATES PATENT AND TRADEMARK OFFICE

CERTIFICATE OF CORRECTION

PATENT NO. : 7,668,684 B2
APPLICATION NO. : 11/797035
DATED : February 23, 2010
INVENTOR(S) : Muro et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 11 days.

On the title page, Under Item (30) please delete:

"20006-233403"

and insert:

--2006-233403--

Signed and Sealed this
Fifteenth Day of February, 2011

David J. Kappos
*Director of the United States Patent and Trademark Office*